United States Patent
Lee et al.

(10) Patent No.: US 10,764,486 B2
(45) Date of Patent: Sep. 1, 2020

(54) MULTI-CAMERA AUTOFOCUS SYNCHRONIZATION

(71) Applicant: QUALCOMM Incorporated, San Diego, CA (US)

(72) Inventors: Jisoo Lee, San Diego, CA (US); Lee-Kang Liu, San Diego, CA (US); Micha Galor Gluskin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 15/868,788

(22) Filed: Jan. 11, 2018

(65) Prior Publication Data
US 2019/0215438 A1  Jul. 11, 2019

(51) Int. Cl.
*H04N 5/232* (2006.01)
*H04N 5/247* (2006.01)
*H04N 17/00* (2006.01)

(52) U.S. Cl.
CPC ..... *H04N 5/23212* (2013.01); *H04N 5/23238* (2013.01); *H04N 5/23296* (2013.01); *H04N 5/232061* (2018.08); *H04N 5/247* (2013.01); *H04N 17/002* (2013.01)

(58) Field of Classification Search
CPC . G02B 7/285; G02B 7/32; G02B 7/40; G02B 7/36–38; G02B 27/16; G02B 27/40; H04N 5/23212; G03B 13/18–30
See application file for complete search history.

(56) References Cited

U.S. PATENT DOCUMENTS

| | | | |
|---|---|---|---|
| 6,359,647 B1 | 3/2002 | Sengupta et al. | |
| 8,723,956 B2 | 5/2014 | Anderson | |
| 9,077,866 B2 | 7/2015 | Aagaard et al. | |
| 10,429,608 B1* | 10/2019 | Baer | G02B 7/285 |
| 2012/0257022 A1* | 10/2012 | Suto | G03B 35/08 348/47 |
| 2012/0257065 A1* | 10/2012 | Velarde | H04N 5/2258 348/175 |
| 2013/0235163 A1* | 9/2013 | Joo | H04N 13/239 348/47 |
| 2016/0147131 A1* | 5/2016 | Richards | G03B 13/36 348/187 |
| 2016/0295097 A1 | 10/2016 | Shanmugavadivelu et al. | |
| 2016/0327643 A1 | 11/2016 | Schwager et al. | |
| 2017/0150126 A1* | 5/2017 | Kim | H04N 5/2257 |
| 2018/0191945 A1* | 7/2018 | Chen | H04N 5/2258 |
| 2018/0270408 A1* | 9/2018 | Chen | H04N 5/2258 |

* cited by examiner

Primary Examiner — Sinh Tran
Assistant Examiner — Selam T Gebriel
(74) Attorney, Agent, or Firm — Duane Morris LLP

(57) ABSTRACT

A method synchronizes autofocus in a system having a master camera and a slave camera. The method comprises: focusing the slave camera based on a map and a result of an autofocus operation by the master camera, while capturing each of a plurality of images. The map relates a plurality of master camera lens positions of the master camera to corresponding slave camera lens positions of the slave camera. An autofocus operation is periodically performed in the slave camera to determine an additional slave camera lens position for an additional image. The map is adaptively updated, based at least partially on the additional slave camera lens position.

25 Claims, 14 Drawing Sheets

MULTI-CAMERA AUTOFOCUS SYNCHRONIZATION

CROSS-REFERENCE TO RELATED APPLICATIONS

None.

STATEMENT REGARDING FEDERALLY SPONSORED RESEARCH OR DEVELOPMENT

None.

BACKGROUND

Field

This disclosure relates to cameras generally, and more specifically to autofocus for multi-camera systems.

Description of Related Art

Many high-end smartphones include two or more cameras, such as a wide-angle and telephoto combination. Such multi-camera systems may allow capabilities, such as image fusion, to provide better low-light performance in a telephoto photograph of a distant subject. Autofocus synchronization attempts to optimally focus the optics of each camera in the multi-camera system on a common subject, while both cameras capture an image. In some cases, instead of improving low-light performance, the image fusion was observed to reduce image fidelity due to poor synchronization of autofocus across two cameras. In some cases, due to poor autofocus synchronization, the image from one camera of a multi-camera system was well-focused, but the image from the other camera was not. When image data from a well-focused image is fused with data from a poorly focused image, the overall result can be lower image quality than the original well-focused image.

SUMMARY

According to one aspect, an example of a method synchronizes autofocus in a system having a master camera and a slave camera. The method comprises: focusing the slave camera based on a map and a result of an autofocus operation by the master camera, while capturing each of a plurality of images. The map relates a plurality of master camera lens positions of the master camera to corresponding slave camera lens positions of the slave camera. An autofocus operation is periodically performed in the slave camera to determine an additional slave camera lens position for an additional image. The map is adaptively updated, based at least partially on the additional slave camera lens position.

According to one aspect, an example of a system is provided for synchronizing autofocus in a master camera and a slave camera. A non-transitory, machine readable storage medium stores a map relating a plurality of master camera lens positions of the master camera to a corresponding plurality of slave camera lens positions of the slave camera. A processor is coupled to the storage medium. The processor is configured with executable instructions to: focus the slave camera based on the map and a result of an autofocus operation by the master camera, while capturing each of a plurality of images, periodically perform an autofocus operation in the slave camera to determine an additional slave camera lens position for an additional image, and adaptively update the map, based at least partially on the additional slave camera lens position.

According to one aspect, an example of a system is provided for synchronizing autofocus in a master camera and a slave camera. A means for determining a slave camera lens position is provided, for focusing a slave camera in response to an autofocus operation performed by the master camera. A means for periodically initiating an autofocus operation in the slave camera is provided to determine a slave camera lens position for capturing a image. A means is provided for adaptively updating the means for determining a slave camera lens position, based at least partially on the additional slave camera lens position for capturing the image.

According to one aspect, an example of a non-transitory, machine readable storage medium stores data and instructions. The instructions are executable by a processor for synchronizing autofocus in a master camera and a slave camera. The medium comprises: a map relating a plurality of master camera lens positions of the master camera to a plurality of corresponding slave camera lens positions of the slave camera, instructions to focus the slave camera based on the map and a result of an autofocus operation by the master camera, while capturing each of a plurality of images, instructions to periodically perform an autofocus operation in the slave camera to determine an additional slave camera lens position for an additional image, and instructions to adaptively update the map, based at least partially on the additional slave camera lens position.

DETAILED DESCRIPTION

Figure 1A:
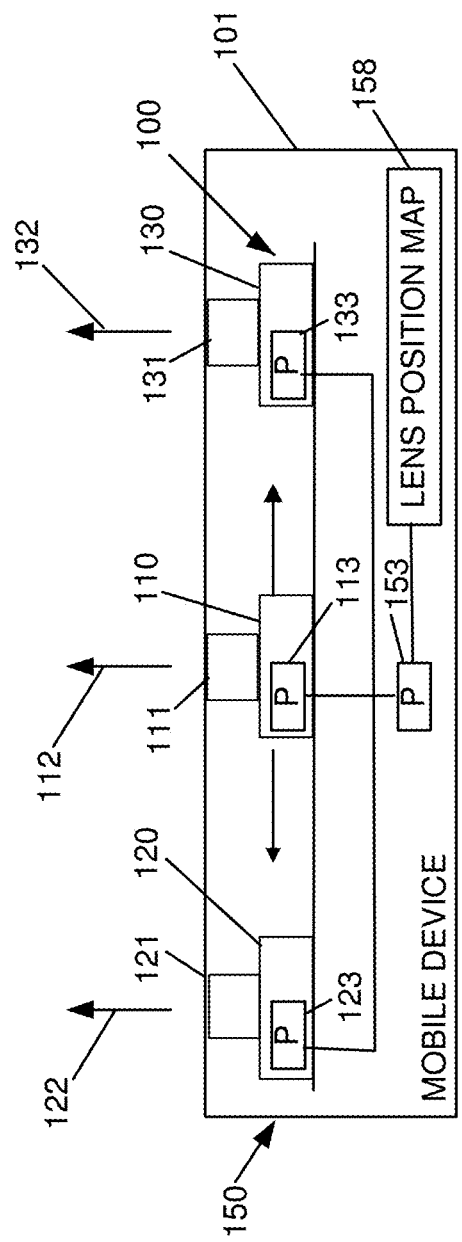
FIG. 1A is a schematic diagram of a mobile device having a multi-camera system.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

Examples of autofocus (AF) techniques for multi-camera systems (e.g., dual-camera systems) are provided below. The examples can be used in multi-camera systems having master-slave control to coordinate lens movements for focusing each camera. The multi-camera system has a master-slave lens position map (referred to herein as "lens position map"). When the master camera is focused, the lens position map prescribes a slave camera lens position corresponding to the current master camera lens position, so that both cameras will be optimally focused. In some embodiments, samples comprising corresponding master and slave lens position pairs are collected while capturing "user-composed" (also referred to herein as user-defined or operational) images (i.e., images which the end user frames and captures for their content after completion of factory testing and initial calibration, and after the multi-camera system is shipped out and ready for use by a consumer or end user. User-defined images are not captured solely for calibration purposes). As used herein, a "user-composed image" is collected during normal camera operation, to capture a user-composed (user-defined) subject or region for its content. Although the user-composed images are not used solely for test or calibration update purposes, a multi-camera system described herein can also use a user-composed image for calibration updates "on-the-fly". The samples are used to adaptively update the lens position map. The updating can be performed using user-composed images, without capturing any predetermined calibration image, and without any predetermined calibration target or subject. The multi-camera system can perform adaptive calibration updates while the camera is online capturing user-defined images, without taking the camera offline and interrupting the user's operation of the camera for image capture. The adaptive updating can be performed online (e.g., without taking the multi-camera system offline), and without performing a dedicated calibration autofocus operation.

In some embodiments, a method synchronizes autofocus of a master camera and a slave camera. A map relates a plurality of master camera lens positions of the master camera to corresponding slave camera lens positions of the slave camera. The slave camera is focused based on the master camera lens position and the map, while capturing each of a plurality of user-composed (user-defined) images. The map provides a means for determining a slave camera lens position for focusing a slave camera in response to an autofocus operation performed by the master camera. An independent autofocus operation is periodically initiated and performed in the slave camera to determine an additional slave camera lens position for an additional user-composed (user-defined) image. The map is adaptively updated, based at least partially on the additional slave camera lens position.

In some embodiments, the additional master camera lens position and the additional slave camera lens position are based at least partially on a plurality of samples collected during a plurality of slave autofocus operations. Each sample includes a master camera lens position and a corresponding slave camera lens position obtained independently. In some embodiments, a single lens position map entry is added or updated, one entry at a time, based at least partially on a cluster of samples collected while capturing user-composed (user-defined) images.

The examples can improve master-slave focus synchronization while the user captures images, regardless of the number of factory calibration points. There is no need to take the camera system offline for re-calibration, place the camera system in a particular location, or capture an image of any predetermined target. The lens position map is independent of a location of the master camera when the multi-image camera system captures an image.

The examples can improve image fusion capabilities, regardless of nonlinearity in lens actuator movement and temperature difference between the two camera modules. The method can compensate for module-to-module variations in the lens focus actuator characteristics and lens characteristics under influences of gravity and camera orientation.

Image fusion combines information from two or more images into a single image. The resulting fused image has more information (e.g., greater dynamic range or greater detail) than either of the input images taken alone. Some multi-camera systems include a wide angle camera and a telephoto camera. Other multi camera systems include a color camera and a monochrome camera. To capture images suitable for fusion using a plurality of cameras, the cameras capture images of a common subject in at least a common image patch within the fields of view of both cameras. To avoid artifacts at a border between a first region containing fused image data and a second region containing data from only one of the two images, both cameras should be optimally focused on the main subject of the images.

To ensure that both images are optimally focused, a multi-camera system may perform independent AF operations within each camera simultaneously. If both cameras perform AF for each image, the overall speed of AF for the multi-camera system is dominated by the camera having the slowest AF. That is, the image is not captured until both cameras complete focusing. Also, if every camera focuses independently, focus errors are additive. If any one of the plurality of cameras is out of focus when a subject is photographed, the set of images of that subject is not suitable for image fusion. The focus error rate for the whole system is generally greater than the focus error rate of any of the individual cameras. (The focus error rate of the multi-camera system can be as high as the sum of the individual error rates of each camera.). For example, if each camera has a 2% focus error rate, the multi-camera system may have up to a 4% focus error rate.

According to another technique, the camera having the more accurate and/or faster AF system is designated the master camera, and the other camera(s) is (are) designated the slave camera(s). The master camera completes AF, and then sends instructions to the (or each) slave camera, enabling the slave camera to determine where to move the slave camera lens without performing an independent coarse autofocus operation in the slave camera. (During an independent AF operation, the slave camera performs coarse AF and fine AF, and does not obtain the slave camera lens position from the lens position map.) Each of the coarse AF and fine AF operations can be a contrast AF, phase detection autofocus (PDAF), laser AF or the like.

FIG. 1A is a schematic diagram of a mobile device 150 including a multi-camera system 100. The mobile device 150 can be a telephone, desktop computer, laptop computer, or dedicated digital camera. The multi-camera system 100 can have a master camera 110 and one or more slave cameras 120, 130. The master camera has a lens 111. Slave camera 120 has a lens 121, and slave camera 130 has a lens 131. While two slave cameras 120, 130 are shown, this is for illustrative purposes only. Mobile device 150 may include any number of slave cameras, including one or more.

The master camera 110 and slave cameras 120, 130 are positioned within a housing 101. The master camera 110 and slave cameras 120, 130 can be fixedly positioned near each other, with their respective optics (not shown) and imaging sensors (not shown) being coplanar or in parallel planes. For example, the lens 111, 121, 131 of each respective camera 110, 120, 130 can be coplanar with or parallel to each other. In a configuration having plural lenses 111, 121, 131 with coplanar or parallel image sensors, the master camera 110 and the slave cameras 120, 130 have the same or substantially the same azimuth angle as each other, the same or substantially the same elevation angle as each other, and the same or substantially the same distance between the imaging sensors and the subject during use. (The azimuth and elevation angles are measured relative to the same reference direction.)

For example, the azimuth and elevation angles are the same or substantially the same in cases where the imaging sensors are parallel, and the distance between the cameras and the subject is much greater than the distance between cameras. In some embodiments, the azimuth angles are the same if the cameras are arranged along a vertical line segment. The elevation angles are the same if the cameras are arranged along a horizontal line segment. In some embodiments, the azimuth and elevation angles are substantially the same, if the distance between the cameras and the subject is at least ten times the center-to-center distance between camera lenses, or if an angle between a first line from the subject to the first camera and a second line from the subject to the second camera is not greater than ten degrees.

Although the fields of view (FOV) of the cameras 110, 120, 130 are not identical, they have a substantial overlap region included in each FOV, and the centers of the FOV are close to each other. Thus, the master camera 110 and slave cameras 120, 130 can all receive incoming light rays directly from a common subject simultaneously, with the overlapping region within the FOV. The master camera 110 and slave cameras 120, 130 can each have a respective processor 113, 123, 133 for controlling local imaging operations. In other embodiments (not shown in FIG. 1A), the master and slave cameras can share a single processor. In further examples, a general processor in the mobile device 150 controls the operations of the master camera 110 and slave cameras 120, 130.

In the description herein, where reference is made to an operation being performed by the multi-camera system 100, the operation can be performed by a master camera processor 113 in the master camera 110, a processor 123 or 133 in the slave camera 120 or 130, by a shared processor 153 of the multi-camera system 100 or by a general processor 152 (FIG. 1B) of the mobile device 150.

In some multi-camera systems 100, such as multi-camera smartphones, the master camera 110 and slave cameras 120, 130 are arranged near each other on the same face of the smartphone, pointing in the same direction 112, 122, 132, respectively. The subject (not shown) has substantially the same distance and direction (pan angle, tilt angle, and height) relative to all the cameras 110, 120, 130 (assuming that the distance between the subject and the cameras 110, 120, and 130 is much greater than the distance between the cameras 110, 120, 130). For example, if the cameras are 2.5 cm (1 inch) apart, and the subject is four feet from the cameras, the difference between pan and tilt angles of the respective cameras 110, 120, 130 is about one degree.

Figure 1B:
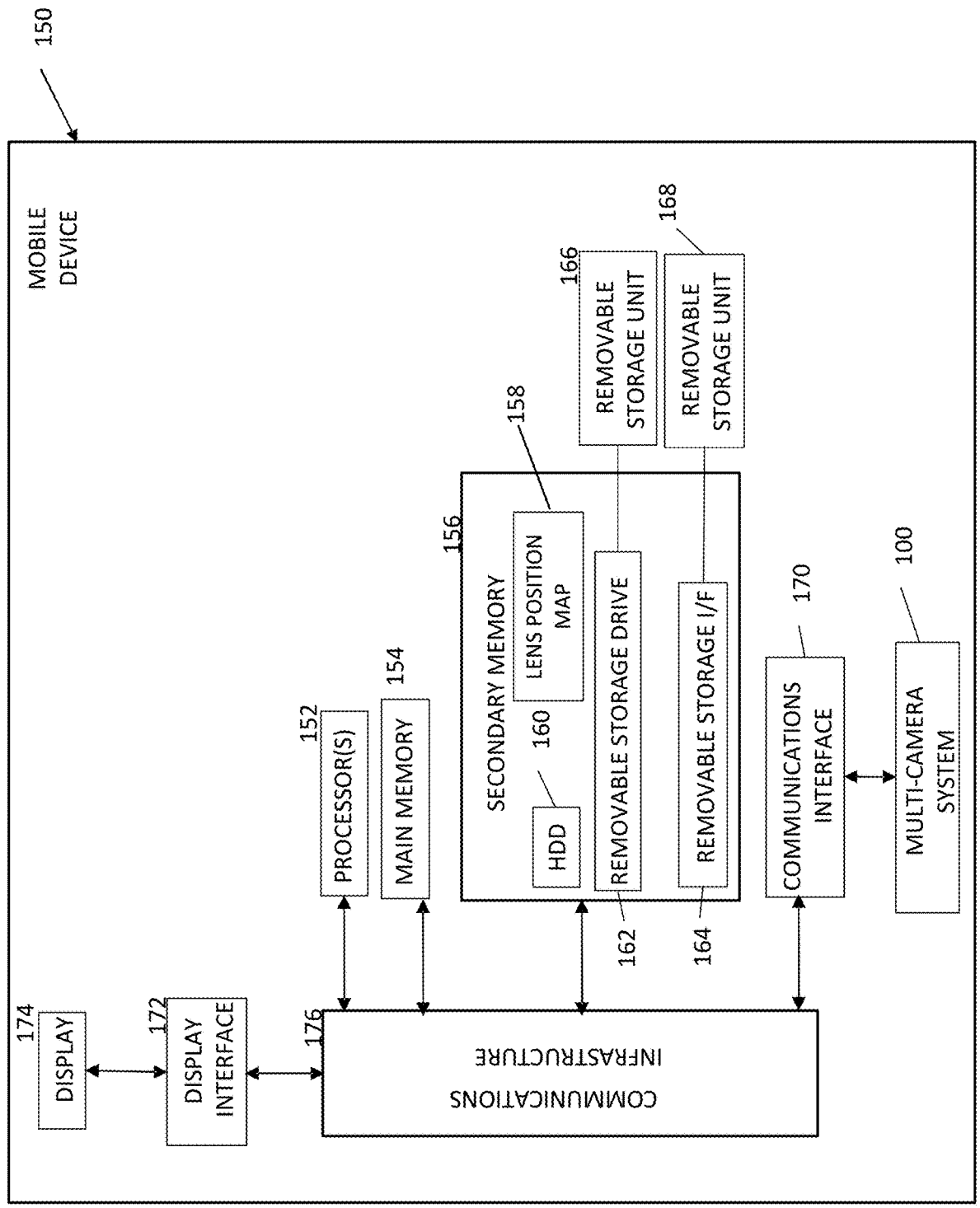
FIG. 1B is a block diagram of the mobile device of FIG. 1A.

FIG. 1B is a block diagram of the mobile device 150 including the multi-camera system 100. The mobile device 150 can be used in some embodiments, e.g., for implementing the processor controlling the multi-camera system 100. Mobile device 150 may include one or more processors 152. Each processor 152 is connected to a communication infrastructure 176 (e.g., a communications bus, cross-over bar, or network). The mobile device 150 can be implemented as a central processing unit, an embedded processor or microcontroller, or an application-specific integrated circuit (ASIC). Mobile device 150 may include a display interface 172 that forwards graphics, text, and other data from the communication infrastructure 176 (or from a frame buffer, not shown) for display on the display unit 174 to a user.

The one or more processors 152 can include the processors 113, 123, 133, 153 (FIG. 1A) coupled to the storage mediums, including the main memory 154, such as a random access memory (RAM), and a secondary memory 156. The one or more processor 152 are configured with executable instructions. The main memory 154 and/or the secondary memory 156 can comprise a dynamic random access memory (DRAM). The secondary memory 156 may include, for example, a hard disk drive (HDD) 160 and/or removable storage drive 162, which may represent a solid state memory, an optical disk drive, a flash drive, a magnetic tape drive, or the like. The removable storage drive 162 reads from and/or writes to a removable storage unit 166. Removable storage unit 166 may be an optical disk, magnetic disk, floppy disk, magnetic tape, or the like. The removable storage unit 166 may include a computer readable storage medium having tangibly stored therein (or embodied thereon) data and/or computer software instructions, e.g., for causing the processor(s) to perform various operations.

In alternative embodiments, secondary memory 156 may include other devices for allowing computer programs or other instructions to be loaded into mobile device 150. Secondary memory 156 may include a removable storage unit 168 and a corresponding removable storage interface 164, which may be similar to removable storage drive 162, with its own removable storage unit 166. Examples of such removable storage units include, but are not limited to, universal serial bus (USB) or flash drives, which allow software and data to be transferred from the removable storage unit 166, 168 to mobile device 150.

Mobile device 150 may also include a communications interface (e.g., networking interface) 170. Communications interface 170 allows instructions and data to be transferred between mobile device 150 and multi-camera system 100. Communications interface 170 also provides communications with other external devices. Examples of communications interface 170 may include a modem, Ethernet interface, wireless network interface (e.g., radio frequency, IEEE 802.11 interface, Bluetooth interface, or the like), a Personal Computer Memory Card International Association (PCM- CIA) slot and card, or the like. Instructions and data transferred via communications interface 170 may be in the form of signals, which may be electronic, electromagnetic, optical, or the like that are capable of being received by communications interface 170. These signals may be provided to communications interface 170 via a communications path (e.g., channel), which may be implemented using wire, cable, fiber optics, a telephone line, a cellular link, a radio frequency (RF) link and other communication channels.

Figure 2:
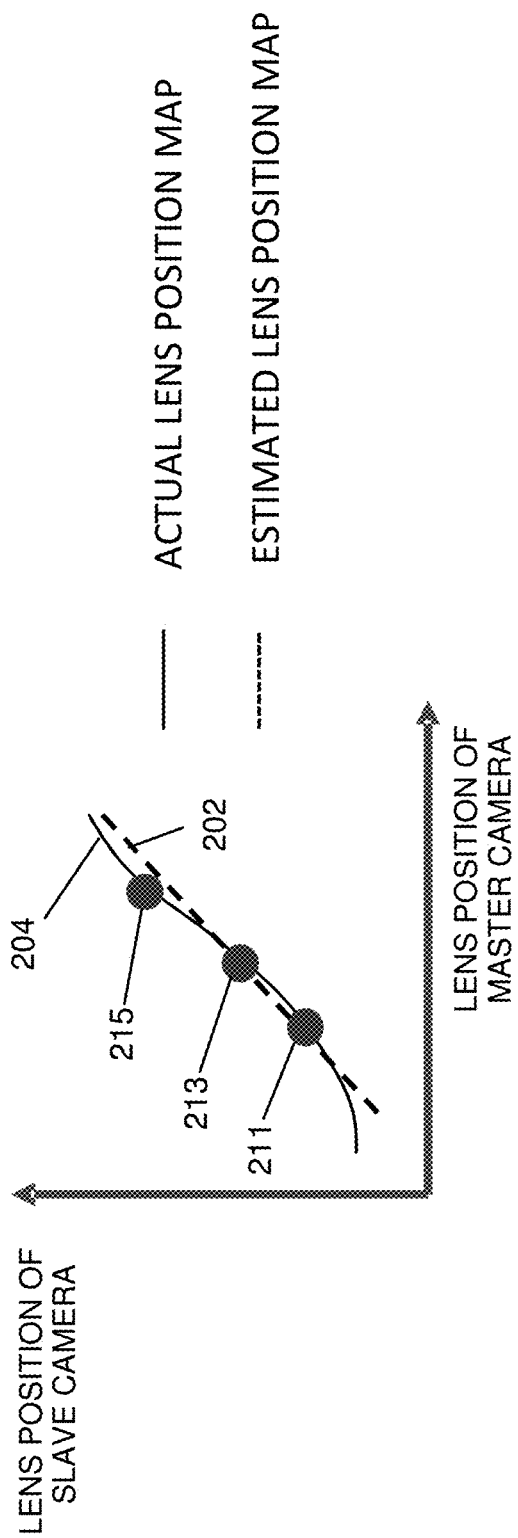
FIG. 2 is a schematic diagram comparing a linear lens position map model to actual lens position data for the mobile device shown in FIG. 1A.

In some systems, the master camera 110 and slave camera 120, 130 (shown in FIG. 1A) are each calibrated at the factory. FIG. 2 shows an example of a factory calibration for a multi-camera system 100 (FIG. 1A), e.g., a wide-telephoto dual camera module having a wide-angle master camera (e.g., 110, FIG. 1A) and a telephoto slave camera (e.g., 120, FIG. 1A). The calibration may include three or four measurements, indicated by points 211, 213, 215, and a regression line 202 or curve 204 fit to the points. (FIG. 2 is a non-exclusive example, and four or more calibration measurements may be provided.)

Referring again to FIG. 1A, for each calibration measurement, independent autofocus operations are performed in the wide-angle (master) camera 110 and telephoto (slave) camera 120, so both cameras 110, 120 are optimally focused on a common subject and the corresponding lens position for each lens (e.g., 111 and 121) is identified. For any other position of the master camera lens 111, the corresponding lens position for the slave camera lens 121 can be determined by interpolation or extrapolation based on the calibration positions. The calibration data, interpolated data, and extrapolated data are stored in a lens position map 158.

A lens position map 158 contains a table stored in the master camera 110, the slave camera 120, or a shared non-transitory, machine readable storage medium (e.g., secondary memory 156, FIG. 1B). The lens position map 158 has a table including a set of rows. (Each row constitutes an entry.) Each row has an initial master camera lens position and an initial slave camera lens position, forming a master/slave lens position pair. The lens position map 158 can include the factory calibration master/slave lens position pairs, and may also include additional interpolated and/or extrapolated master/slave lens position pairs. The lens position map 158 can accommodate non-linearity in the relationship between the master and slave camera lens positions. Table 1 shows an example of the contents of a lens position map 158 (FIG. 1A) for a multi-camera system 100 which is a dual-camera system.

TABLE 1

Lens position map 158 (FIG. 1B)

| Master Camera Lens Position | Slave Camera Lens position |
|---|---|
| 0 | 30 |
| 100 | 40 |
| 200 | 50 |
| 300 | 100 |
| 400 | 150 |
| 500 | 400 |
| 600 | 600 |
| 700 | 800 |

Referring again to FIG. 1A, lens position map 158 can be used in devices where the master camera 110 and slave camera 120 have fixed positions relative to each other and are oriented to receive direct light rays from the same direction. Each master camera lens position has a corresponding slave camera lens position. If the master camera lens 111 is optimally focused at one of the master camera lens positions in Table 1, then the slave camera 120 can be focused by moving the slave camera lens 121 to the slave camera lens position in the same row (referred to herein as an "entry") of the table as the current master camera lens position. Thus, the lens position map 158 provides a means for determining a slave camera lens position for focusing a slave camera 120 in response to an autofocus operation performed by the master camera 110. The slave camera 120 can be focused without performing an independent AF operation in the slave camera 120.

For a given subject, once the AF system for the master camera 110 determines the next lens position for the master camera 110, the master camera 110 performs a table lookup in the lens position map 158 to determine the next slave camera lens position corresponding to the next lens position of the master camera 110. Once the AF system for the master camera 110 determines the optimal lens position for the master camera 110, a table lookup in the lens position map 158 determines the slave camera lens position corresponding to the optimal lens position of the master camera 110. If the master camera lens position is between two entries in the lens position map 158, then the two entries are retrieved, and the slave camera lens position can be determined by linear interpolation in real time. Using the lens position map 158, a slave camera lens position can be determined directly from the master camera lens position, without performing an independent AF operation in the slave camera, and without identifying the distance or location of the subject.

In the example of FIG. 2, the relationship between the optimal focus position for the master camera lens 111 (FIG. 1A) and the optimal focus position for the slave camera lens 121 (FIG. 1A) is non-linear, as shown by curve 204. Within the expected operating conditions of the multi-camera system 100 (FIG. 1A), the curve 204 can be approximated by a regression line 202. The lens position map 158 (FIG. 1B) (e.g., Table 1) can be populated with interpolated points along the regression line 202. Alternatively, given three or more calibration master/slave lens position pairs, a quadratic equation can be fit to the calibration points 211, 213, 215. Given calibration data including four or more master/slave lens position pairs, a cubic equation can be fit to the calibration points.

Figure 3A:
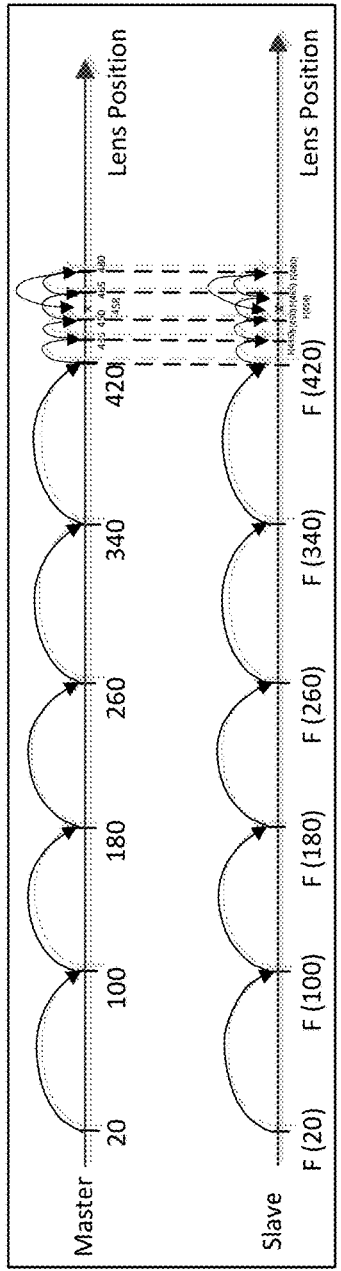
FIG. 3A shows lens positions for a master camera and a slave camera as shown in FIG. 1A, during contrast autofocus using a "complete follow" technique.
Figure 3B:
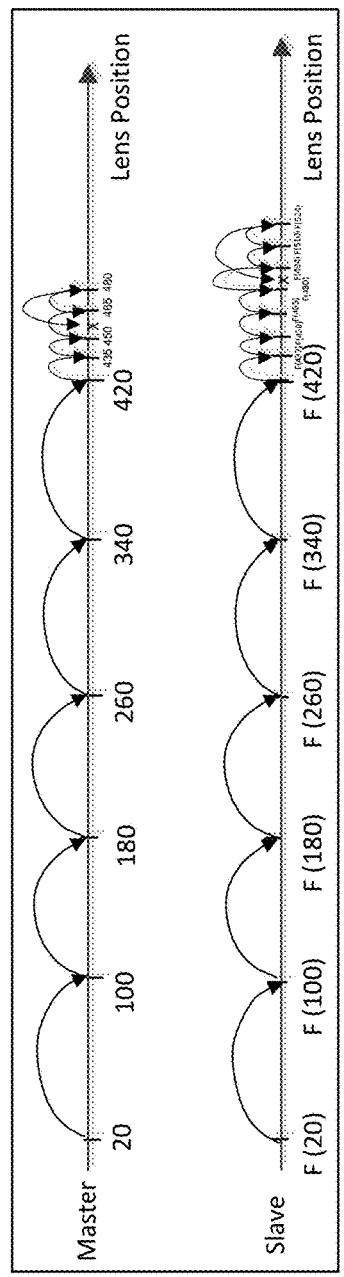
FIG. 3B shows lens positions for a master camera and a slave camera as shown in FIG. 1A, during contrast autofocus using a "sequential follow" technique.
Figure 3C:
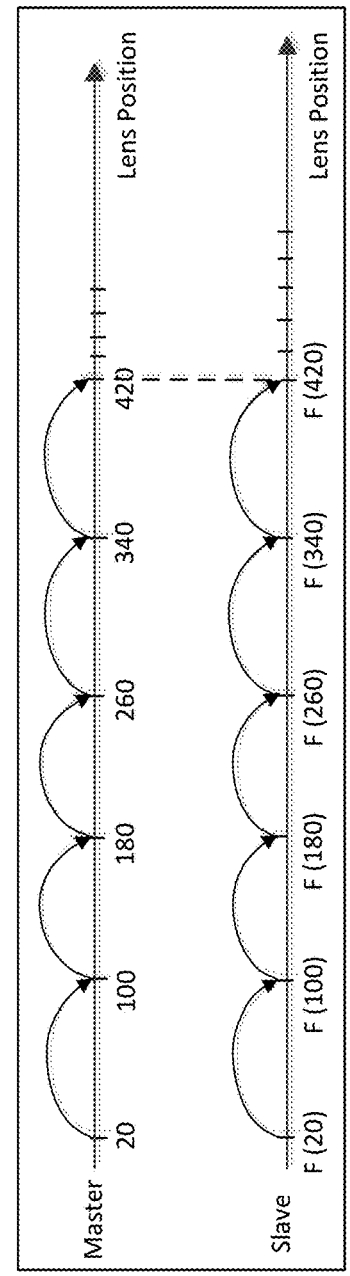
FIG. 3C shows lens positions for a master camera and a slave camera as shown in FIG. 1A, during contrast autofocus using an "independent follow" technique.

FIGS. 3A-3C are exemplary schematic diagrams of master-slave focusing methods. In FIGS. 3A-3C, a coarse AF operation is performed in the master camera 110 (FIG. 1A). In FIGS. 3A-3C, the coarse AF operation begins with a master camera lens position of 20 and continues till the master camera lens position is 420. The corresponding coarse AF operation in the slave camera 120 (FIG. 1A) begins with a slave camera lens position of F(20) and extends till the slave camera lens position is F(420), where F is the empirically determined relationship between the master camera lens position and the slave camera lens position. The relationship F is initially determined based on the factory calibration. The lens position at the conclusion of the coarse AF operation is used for a table lookup in the lens position map 158 (FIG. 1B) (e.g., Table 1) to determine the corresponding coarse lens position for the slave camera 120 (FIG. 1A). Then, fine AF operations are performed in the master camera 110 (FIG. 1A) and in the slave camera 120 (FIG. 1A).

FIGS. 3A-3C show three techniques for lens focus synchronization between a master camera 110 and a slave camera 120 (both shown in FIG. 1A). These techniques can be used with a single slave camera 120 (FIG. 1A) or with plural slave cameras 120, 130 (FIG. 1A). In the examples of FIG. 3A-3C, all of the independent AF operations are performed using contrast AF, and include a plurality of lens movements before selecting the optimum lens position. In other embodiments, the coarse AF and/or the fine AF of the master camera 110 (FIG. 1A) and/or the fine AF of the slave camera 120 (FIG. 1A) can use PDAF. If PDAF or laser (time of flight) AF control is used, the series of incremental lens movements of the coarse AF can be replaced by a single lens movement.

FIG. 3A shows the master lens position and corresponding slave lens position over a plurality of increments using contrast AF in a "complete follow" technique. In this technique, the slave camera coarse focus is synchronized with the master camera coarse focus, and then the slave camera fine focus is synchronized with the master camera fine focus.

When the master camera lens 111 (FIG. 1A) is at position 20, the slave camera lens 121 (FIG. 1A) is at F(20), where F can be the function defined by a regression line 202 or curve 204 (both shown in FIG. 2) through the calibration points 211, 213, 215 (FIG. 2). The master camera lens 111 (FIG. 1A) moves in large increments of 80 units to positions 100, 180, 260, 340 and 420, and the slave camera lens 121 (FIG. 1A) moves in large increments to positions F(100), F(180), F(260), F(340) and F(420). (The 80 unit increment is a non-limiting example, and the length of the increment can be varied). During the fine calibration, the master camera lens 111 (FIG. 1A) moves in smaller increments of 15 units to positions 435, 450, 465, 480 and back to 458, and the slave camera lens 121 (FIG. 1A) moves in corresponding increments to positions F(435), F(450), F(465), F(480) and back to F(458). (The 15 unit increment is a non-limiting example, and the length of the increment can be varied). Each time the master camera 110 (FIG. 1A) moves during coarse and fine AF, the master camera processor 113 or slave camera processor 123 (both shown in FIG. 1A) performs a table lookup and retrieves the slave camera position corresponding to the master camera position. This method substantially reduces the delay between the end of the fine AF in the master camera 110 (FIG. 1A) and the end of the fine AF in the slave camera (FIG. 2).

FIG. 3B shows the master lens position and corresponding slave lens position over a plurality of increments using contrast AF in a "sequential follow" technique. In this technique, the slave camera coarse AF and fine AF are synchronized with the master camera coarse AF and fine AF, respectively—as described above with respect to FIG. 3A—and then the slave camera performs an additional fine AF. The master camera 110 (FIG. 1A) (or slave camera 120 (FIG. 1A) performs a table lookup of the slave camera lens position corresponding to each position of the master camera lens 111 (FIG. 1A) until the master camera 110 (FIG. 1A) is at position 480 and the slave camera is at position F(480). Next, the master camera lens 111 (FIG. 1A) moves back to F(458), and the slave camera 120 (FIG. 1A) performs a finer AF with an increment that can be different from the increment of the coarse AF and/or fine AF. For example, in FIG. 3B, the slave camera lens 121 (FIG. 1A) moves to F(494), F(510) and F(524), and then moves back to about F(487). This method substantially reduces the delay between the end of the fine AF in the master camera 110 (FIG. 1A) and the end of the first fine AF in the slave camera 120 (FIG. 1A).

FIG. 3C shows the master lens position and corresponding slave lens position over a plurality of increments using contrast AF in an "independent follow" technique. In this technique, the slave camera coarse AF is synchronized with the master camera coarse AF—as described above with respect to FIG. 3A—and then the master and slave cameras (110 and 120, FIG. 1A) perform fine AF independently of each other. The master (or slave) camera performs a table lookup of the slave camera lens position corresponding to each position of the master camera lens 111 (FIG. 1A) until the master camera 110 (FIG. 1A) is at position 420 and the slave camera 120 (FIG. 1A) is at position F(420), as indicated by the dashed line in FIG. 3C. Next, the master camera 110 (FIG. 1A) performs fine AF with a first position increment, and the slave camera 120 (FIG. 1A) performs fine AF with a second position increment. The first position increment and the second position increment can have the same size as each other or different sizes from each other. This method substantially reduces the delay between the end of the coarse AF in the master camera 110 (FIG. 1A) and the end of the coarse AF in the slave camera 120 (FIG. 1A).

In each of the above techniques (complete follow, sequential follow and independent follow), the AF delay and/or focus accuracy of the slave camera 120 (FIG. 1A) can be affected by any inaccuracy in the lens position map 158 (FIG. 1B).

Referring again to FIG. 1A, operating conditions during use of the multi-camera system 100 can differ from the calibration conditions. For example, during calibration both the master camera 110 and slave camera 120 can be warmed or cooled to the same temperature as each other. During operation, one of the cameras 110 or 120 can be turned on more often than the other camera 120 or 110. For example, if the camera system 100 is operated at the longest focal length of the telephoto lens (e.g., slave camera lens 121) of the telephoto camera (e.g., slave camera 120), the wide-angle camera (e.g., master camera 110) may be turned off to reduce battery discharge. Thus, the wide-angle camera (e.g., master camera 110) and telephoto camera (e.g., slave camera 120) can have different duty cycles (ratio of operating time to total time). The camera 110 or 120 having a higher duty cycle may run at a higher temperature than the camera 120 or 110 having a lower duty cycle. The temperature differential between the cameras 110, 120 can result in differential expansion of the master camera lens 111 and slave camera lens 121 in the respective cameras 110, 120 (particularly if lenses 111, 121 comprise plastic). The lens position map 158 (FIG. 1B) can vary with differential lens expansion between cameras 110, 120.

Figure 4:
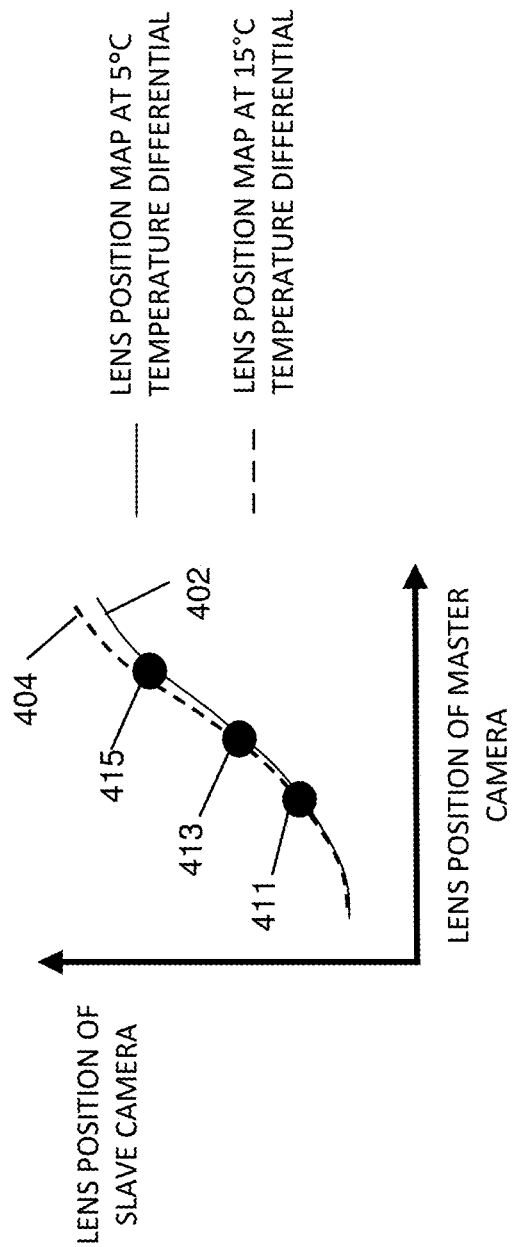
FIG. 4 is a diagram showing variation of the lens position map with temperature differential between master and slave camera lenses for the mobile device shown in FIG. 1A.

FIG. 4 is a diagram showing how the lens position map 158 (FIG. 1B) may vary with the temperature difference between master and slave cameras 110 and 120 (FIG. 1A). The calibration points 411, 413, 415 can be obtained from factory calibration. The lens position map 158 (FIG. 1B) curve 402 can represent a curve fitted to the factory calibration data. The lens position map 158 (FIG. 1B) curve 402 corresponds to a five-degree difference between the temperature of the master camera 110 (FIG. 1A) and the temperature of the slave camera 120 (FIG. 1A). The lens position map 158 (FIG. 1B) curve 404 corresponds to a 15-degree difference between the temperature of the master camera 110 (FIG. 1A) and the temperature of the slave camera (FIG. 1A), which can occur during operation. The difference between the lens position map 158 (FIG. 1B) curves 402 and 404 is smaller for lens positions corresponding to shorter focal lengths and larger for lens positions corresponding to longer focal lengths. Thus, a camera system using the complete follow method of FIG. 3A and the lens position map 158 (FIG. 1B) curve 402 would have AF errors at longer focal lengths when operated with a 15-degree temperature difference between the master camera lens and the slave camera lens.

Other factors can cause the lens position map 158 (FIG. 1B) to deviate from the calibration data during operation. For example, the individual temperatures of the master camera lens 111 (FIG. 1A) and the slave camera lens (121) can also affect the lens position map 158 (FIG. 1B). A ten-degree temperature difference between the master camera lens 111 and slave camera lens (both in FIG. 1A) may cause a greater deviation from the calibration data when the master camera 110 is at 30° C. than when the master camera 110 is at 0° C.

Movements of the actuator (not shown) of the camera lens 111, 121 (FIG. 1A) can also cause deviation from the calibration data. Lens actuator movements can introduce non-linearity. For example, monochrome and color imaging sensors with open-loop actuators can have different results from their calibration data, if they have different open-loop actuators (i.e., actuators without position feedback). Open loop actuators can actuate the master camera lens 111 and slave camera lens 121 (both shown in FIG. 1A) in a non-linear manner, especially at extreme macro focal length or close to infinite focal length. Any deviation between the expected actuator position and the actual actuator position can degrade focus.

In some cases, camera orientation can also be a factor. If the master camera lens 111 and slave camera lens 121 (FIG. 1A) have different weights and have open loop actuators, they can experience differential gravity-induced lens sag depending on the orientation of the camera system 100 (FIG. 1A).

Figure 5A:
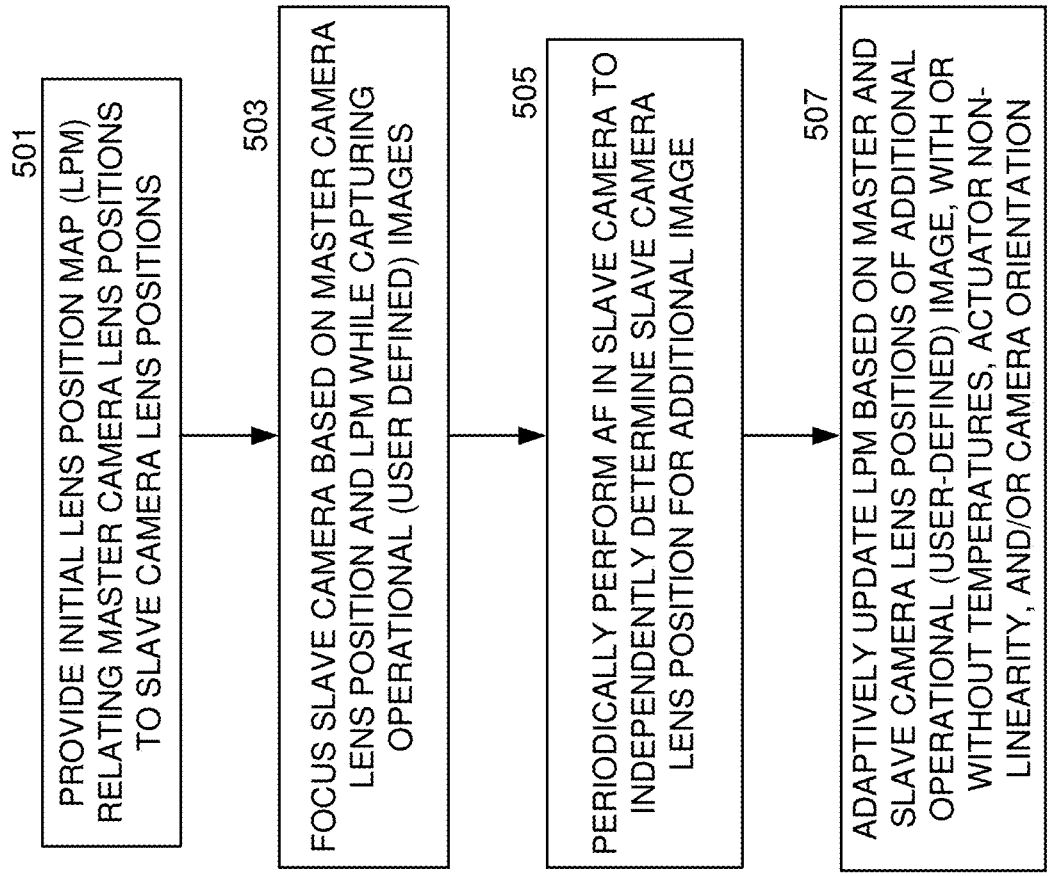
FIG. 5A is a flow chart of a method for lens position map updates for the mobile device shown in FIG. 1A.

FIGS. 5A-5D are flow charts of exemplary methods. In the description of FIGS. 5A-5D, unless otherwise noted, the referenced devices are shown in FIG. 1A. FIG. 5A is a flow chart showing a method for synchronizing AF in a multi-camera system 100 having a master camera 110 and a slave camera 120.

At block 501, a non-transitory machine-readable storage medium of the multi-camera system 100 provides an initial lens position map 158 (e.g., having contents as shown in Table 1) relating a plurality of master camera lens positions of the master camera 110 to corresponding slave camera lens positions of the slave camera 120. For example, the initial lens position map 158 can be a table generated by determining a regression line or curve based on factory calibration data, and interpolating pairs of master camera lens position and corresponding slave camera lens position from the regression curve at even intervals along the master camera lens position axis.

At block 503, while the user captures a plurality of user-composed images (not captured exclusively for calibration) the master camera AF system operates to independently focus the master camera 110. The slave camera 120 is focused based on the master camera lens position and the lens position map 158, without performing an independent AF operation in the slave camera 120. In some embodiments (e.g., using "complete follow"), the slave camera lens position is determined based on the master camera lens position and the lens position map 158, after each incremental movement during coarse focus and fine focus, without any independent AF operation in the slave camera 120. In some embodiments (e.g., using PDAF), the slave camera lens position is determined based on the master camera lens position after coarse focus and again after fine focus, without any independent AF operation in the slave camera 120. In other embodiments (e.g., using "independent follow"), the slave camera lens position is set according to the master camera lens position after each incremental movement of the master camera lens 111 during coarse AF, and then an independent fine AF is performed in the slave camera 120.

At block 505, the slave camera 120 periodically performs an independent AF operation—including a coarse autofocus and a fine autofocus—to determine a slave camera lens position for an additional user-defined image. The independent AF operation redundantly provides a slave camera lens position, since the slave camera lens position is also available based on the master camera lens position and the lens position map 158. In some embodiments, the independent AF operation is performed each time the multi-camera system 100 captures a predetermined number of user-defined images. For example, capture of every tenth user-defined image can include an independent slave camera AF operation. In some embodiments, the predetermined number is selectable by the user. In other embodiments, the predetermined number is a hard-coded value. The predetermined number is sufficiently large (e.g., 10) to reduce total focusing time for most images and reduce battery drainage. In other embodiments, the independent AF operation is performed upon each occurrence of a predetermined event, such as passage of a predetermined period of time.

At block 507, the master camera 110 (or the slave camera 120) adaptively updates the lens position map 158 (e.g., Table 1), based on the master camera lens position and slave camera lens position of the additional user-defined image. The adaptive updates are made in or near real-time, while the camera is being operated by the end-user, without interrupting image capture, and without taking the camera offline for re-calibration. The adaptive updates change the lens position map 158 for selecting slave camera lens positions based on the master camera lens position.

Figure 5B:
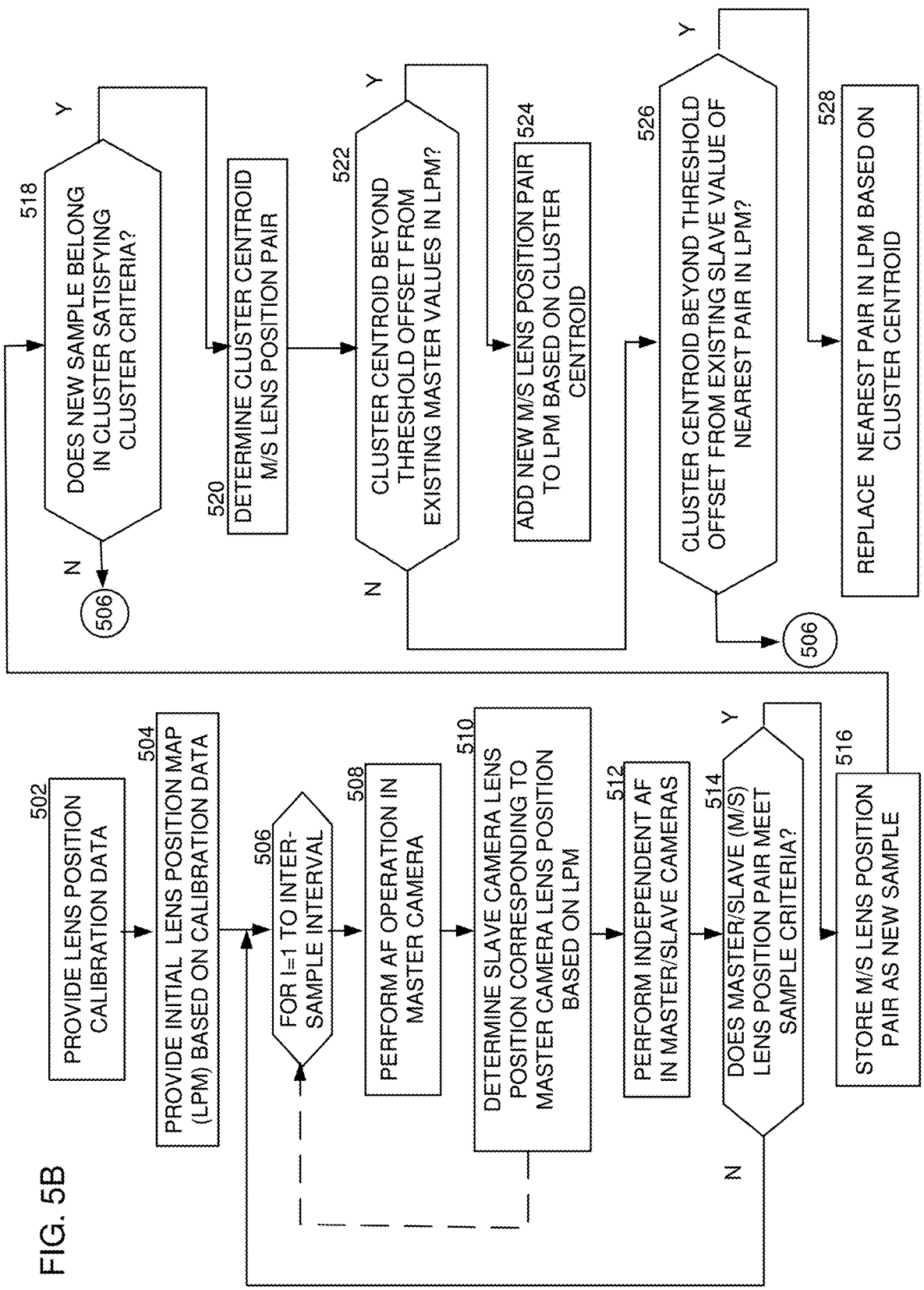
FIG. 5B is a flow chart of a more detailed example of a method for lens position map updates for the mobile device shown in FIG. 1A.

FIG. 5B is a detailed flow chart of an example of a multi-camera method.

At block 502, a set of lens position calibration data is provided, relating the master camera lens position to the slave camera lens position while both the master camera 110 and slave camera are co-located and focused on a common subject, and both the master and slave cameras 110, 120 are pointed in the same direction 112, 122. In some embodiments, the calibration data are provided by a camera vendor based on a factory calibration of the master camera 110 and slave camera 120.

At block 504, a lens position map 158 (e.g., Table 1) is provided, based on the calibration data. In some embodiments, a plurality of master camera lens position/slave camera lens position pairs are selected from a least squares regression line or curve based on the calibration data. In some embodiments, a plurality of master camera lens position/slave camera lens position pairs are determined by linear or quadratic interpolation between the calibration data or extrapolation beyond the calibration data. The lens position map 158 is stored in a non-transitory, machine readable storage medium 156 (FIG. 1B) accessible by the master camera 110 or the slave camera 120.

At block 506, a loop containing blocks 508 and 510 is repeated for a number of iterations corresponding to a predetermined inter-sample interval. The inter-sample interval is a number of consecutive images captured using the lens position map 158 to determine the slave camera lens position, without performing an independent AF operation in slave camera 120. In some embodiments, the inter-sample interval is hard-coded by the manufacturer. In other embodiments, the inter-sample interval is a user-input value.

Next, blocks 506, 508, 510 and 512 are performed, providing a means for periodically initiating an autofocus operation in the slave camera 120 to determine a slave camera lens position for capturing a user-defined image.

At block 508, the user initiates camera focusing to capture a user-defined image of a subject. The multi-camera system 100 initiates an independent (coarse plus fine) AF operation in the master camera 110, but no independent fine AF is initiated in the slave camera 120. In some embodiments, neither an independent coarse AF nor an independent fine AF is initiated in the slave camera 120.

At block 510, the slave camera 120 determines a slave camera lens position corresponding to the master camera lens position based on the lens position map 158, for capturing a user defined image. If the master camera lens position is between two of the entries in the lens position map 158, the corresponding slave camera lens position is determined by interpolation. In some embodiments a coarse slave camera lens position is obtained from the lens position map 158, and a fine AF is performed in the slave camera 120. In other embodiments both coarse and fine slave camera lens positions are obtained from the lens position map 158.

At block 512, after obtaining the slave camera lens position from the lens position map 158 for the predetermined number of iterations, the next time the user initiates image capture, independent AF operations are performed in both the master camera 110 and the slave camera 120.

Blocks 514-528 provide a means for adaptively updating the lens position map 158 based at least partially on the additional slave camera lens position for capturing the user-defined image. The lens position map 158 in turn provides the means for determining a slave camera lens position for focusing the slave camera 120 in response to an autofocus operation performed by the master camera 110.

At block 514, the multi-camera system 100 determines whether the collected master/slave lens position pair (also referred to herein as a "sample") corresponding to the captured image meets a predetermines set of sample acceptance criteria for use in updating the lens position map 158. If the sample acceptance criteria are met, control passes to block 516. In some embodiments, if the sample acceptance criteria are not met, control passes to block 506, and another group of images is captured using the master camera lens position and the lens position map 158 to position the slave camera lens 121, before again performing an independent (coarse plus fine) slave camera AF operation and collecting another sample. In other embodiments (not shown), if the sample acceptance criteria are not met, control passes to block 512, and an independent slave camera AF operation is performed for the next image captured, to collect an additional sample immediately. An example of the criteria of block 514 is described below in the discussion of FIG. 8.

At block 516, the new master/slave position pair is stored as a new sample in a non-transitory, machine-readable storage medium. To avoid making a large change in the lens position map 158 (if an outlier master/slave lens position pair is obtained), the exemplary method accumulates several samples before updating the lens position map 158.

At block 518, the multi-camera system 100 determines whether the new sample, in combination with some or all of the previously accumulated samples, satisfy predetermined cluster criteria. If the cluster criteria are met, control passes to block 520. If the criteria are not met, control passes to block 506. An example of the cluster criteria of block 518 is described below in the discussion of FIG. 9.

Referring again to FIG. 5B, at block 520, the multi-camera system 100 determines a pair comprising the average of the master camera lens positions and the average of the slave camera lens positions of the samples within the cluster.

In various embodiments, the averages can be the arithmetic means, the medians, or the modes. In the example below, the average is the arithmetic mean. (For brevity, the master/slave lens position pair including the average of the master camera lens positions and the average of the slave camera lens positions of the samples within the cluster is referred to herein as the "cluster centroid". The cluster centroid is defined in a two-dimensional master camera lens position-slave camera lens position space.)

At block 522, the multi-camera system 100 determines whether the cluster centroid has more than a threshold master camera lens position offset (the "first threshold offset") from the nearest master camera lens position values in the lens position map 158. If the cluster centroid has more than the first threshold offset from the nearest master camera lens position values in the lens position map 158, control passes to block 524. If the cluster centroid has a master camera lens position offset less than (or equal to) the first threshold offset, control passes to block 526. The first threshold offset may be in a range from one to three times the standard deviation of the master camera lens positions in the cluster. The smaller the first threshold offset is, the more likely it is that a new entry will be added to the lens position map 158 for a given cluster centroid.

At block 524, since the cluster centroid is offset from the nearest master camera lens position by more than the first threshold offset, a new entry is added in the lens position map 158 based on the cluster centroid.

At block 526, since the cluster centroid is offset from the nearest master camera lens position by a distance less than (or equal to) the first threshold offset, the cluster centroid may be used in determining a replacement for the nearest master/slave lens position pair in the lens position map 158. To avoid frequent noisy updates to lens position map 158, the multi-camera system 100 determines whether the cluster centroid has a slave camera lens position offset from the slave camera lens position of the nearest entry in the lens position map 158 by more than a threshold slave camera lens position offset (the "second threshold offset"). If the slave lens position offset is more than the second threshold value, control passes to block 528. If the slave lens position offset is less than (or equal to) the second threshold, control passes to block 506. The smaller the second threshold is, the more likely it is that the cluster centroid will replace the lens position map 158 entry having the smallest offset from the master camera lens position.

At block 528, in response to a determination that the master lens position of the cluster centroid is less than a threshold offset from the nearest master camera lens position among the existing entries in the position map 158, the multi-camera system 100 replaces a single one of the entries. The single entry is replaced by replacing (adjusting) the slave camera lens position for the entry having the nearest master camera lens position, based on the cluster centroid. In some embodiments, the nearest entry in the lens position map 158 is replaced, based on the cluster centroid. In some embodiments, the cluster centroid replaces the nearest entry in the lens position map 158. In other embodiments, a replacement entry between the cluster centroid and the nearest previous entry in the lens position map 158 is selected, to make changes to the lens position map 158 more gradual.

Figure 5C:
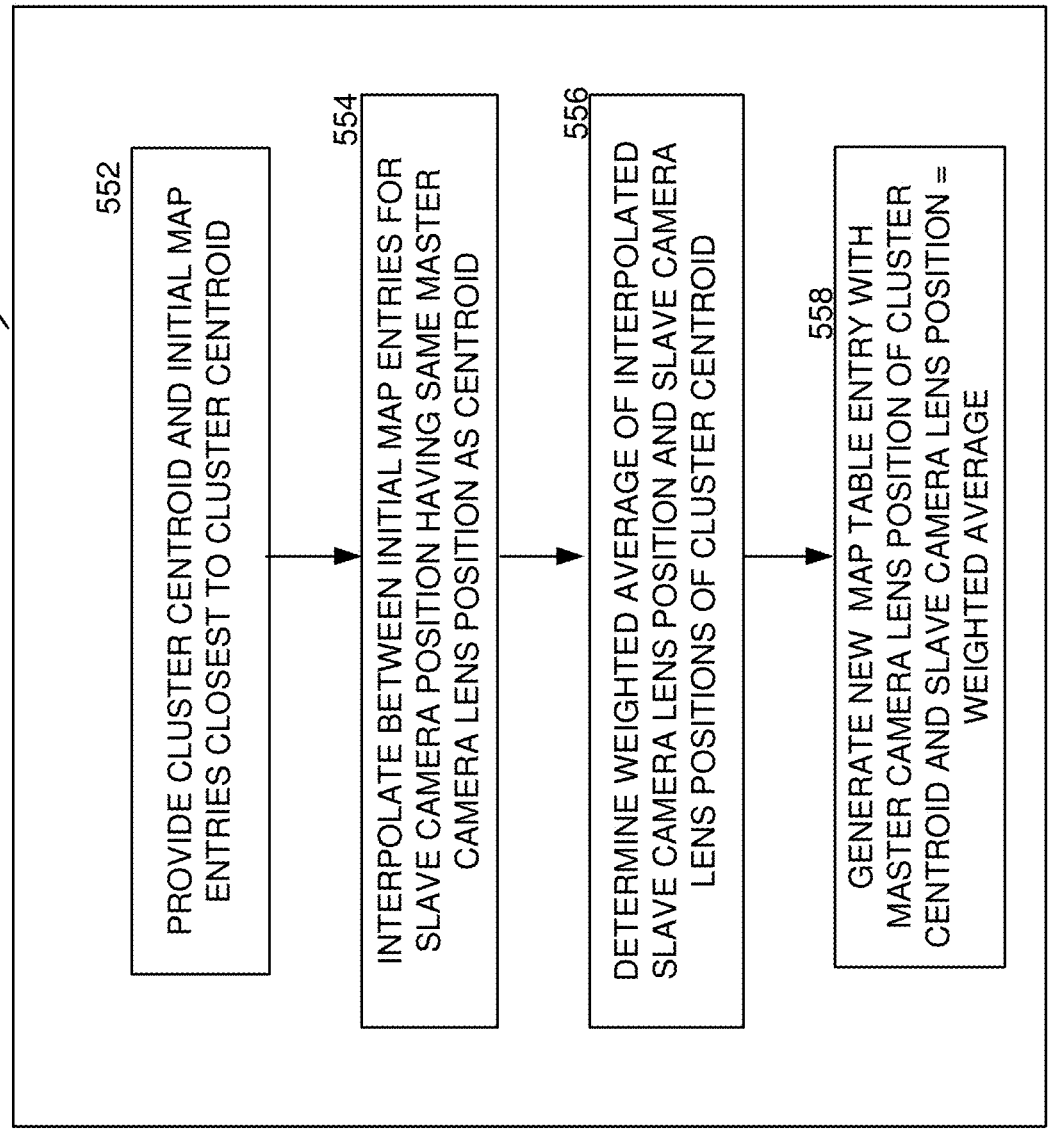
FIG. 5C is a flow chart of adding a new master-slave lens position pair to the lens position map.
Figure 5D:
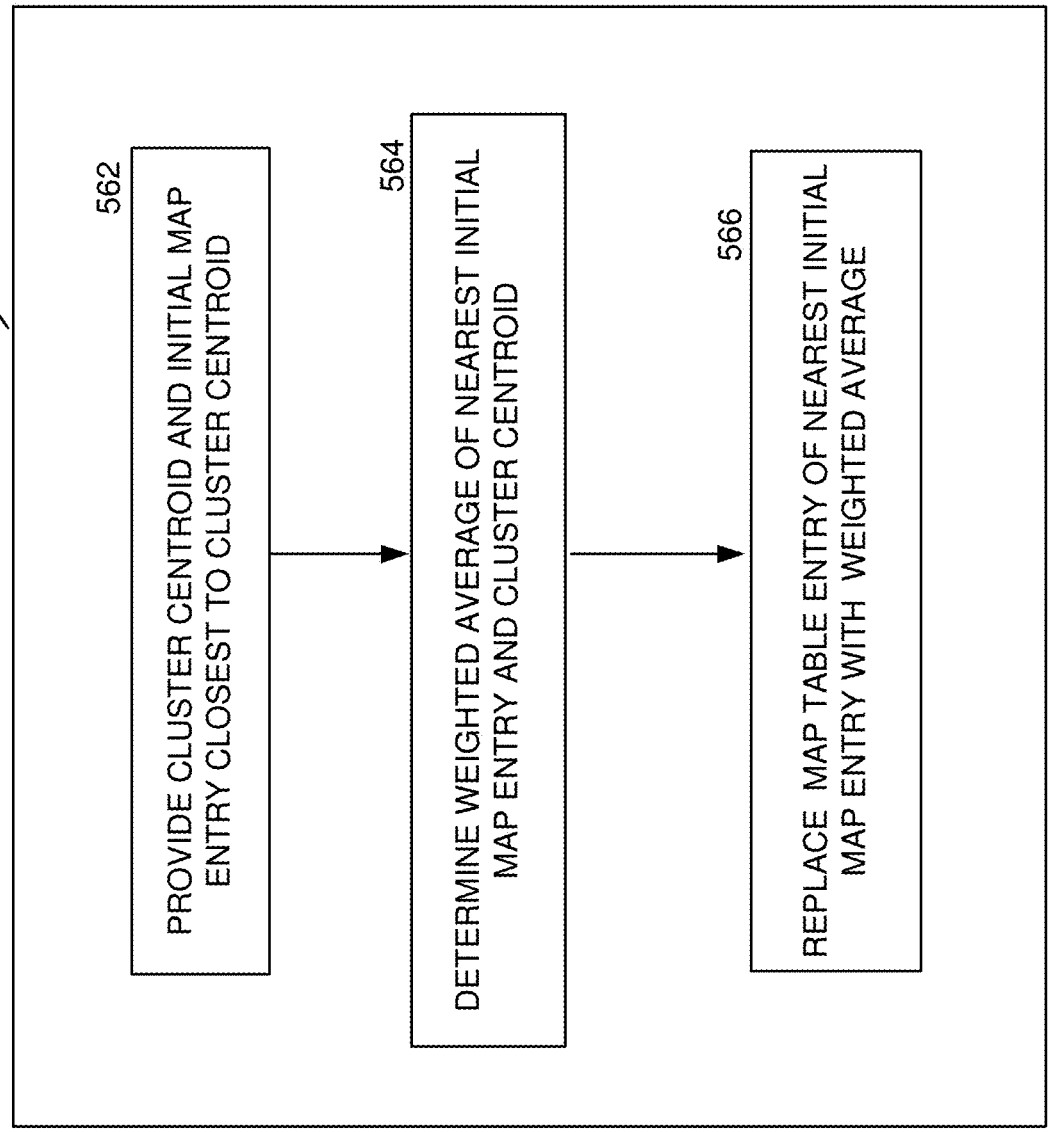
FIG. 5D is a flow chart of replacing an entry in the lens position map.

FIGS. 5C and 5D are flow charts showing gradual learning of lens position map 158 changes from the slave camera AF results collected during user-defined imaging (without re-calibrating the lens position map 158). The updates to the lens position map 158 are implemented gradually to avoid introducing artifacts.

FIG. 5C shows the addition of a new lens position map 158 entry based on the cluster centroid. At block 552, master camera processor 113 (or slave camera processor 123) compares the additional master and slave camera lens positions of the cluster centroid to the nearest map entries from the initial set of master camera lens positions and corresponding slave camera lens position. The master camera processor 113 (or slave camera processor 123) provides the cluster centroid and the two entries from the initial lens position map 158 closest to the cluster centroid (having respective master camera lens positions less than and greater than the master camera lens position of the cluster centroid).

At block 554, the master camera processor 113 (or slave camera processor 123) can interpolate between two entries from the initial lens position map 158 to determine a slave camera lens position corresponding to the same master camera lens position as the cluster centroid. This interpolated value is the slave camera lens position on the initial line (or curve) drawn from the lens position map 158, directly above or below the cluster centroid.

At block 556, the master camera processor 113 (or slave camera processor 123) can determine a weighted average of the interpolated slave camera lens position and the slave camera lens position of the cluster centroid. The weighted average essentially interpolates between the initial slave camera lens position and the slave camera lens position of the cluster centroid.

The amount of weight assigned to the cluster centroid determines how quickly the lens position map 158 changes based on captured images. In some embodiments, to avoid artifacts, the slave camera lens position (along the line or curve) of the initial lens position map 158 is assigned greater weight than a weight assigned to the additional slave camera lens position of the cluster centroid, so that updates are more gradual. For example, the cluster centroid may be assigned a weight of 30%. In other embodiments, a weight assigned to the additional slave camera lens position of the cluster centroid is greater than the weight of the interpolated slave camera lens position based on the initial lens position map 158 value, so that updates are more rapid.

Regardless of whether a weight assigned to the additional slave camera lens position of the cluster centroid is greater than the weight given to the initial slave camera lens position, the method adds a single entry at a time to the lens position map 158 after a statistically significant sample is collected. Additions to the lens position map 158 only affect the portions of the lens position map 158 where a statistically significant sample has been collected.

At block 558, a new entry is added to lens position map 158. The new entry includes an additional master camera lens position and the additional slave camera lens position, based at least partially on the plurality of samples collected during the independent slave camera AF operations. The additional slave camera lens position is also partially based on the initial master camera lens positions and corresponding initial slave camera lens positions in the initial lens position map 158. In some embodiments, the new entry includes the master camera lens position of the cluster centroid and the slave camera lens position of the weighted average.

In another embodiment (not shown), after a new entry is added to the lens position map 158, a new regression curve is fit to the union of the initial lens position map 158 entries and the added entry. The new regression curve may have changes outside of the immediate region of the cluster and/or may have smaller impact in the region of the cluster. An updated lens position map 158 can be generated based on the new regression curve.

FIG. 5D is a flow chart showing the replacement of an existing entry in lens position map 158 based on the cluster centroid. At block 562, master camera processor 113 (or slave camera processor 123) compares the additional master and slave camera lens positions of the cluster centroid to the nearest entry in the initial lens position map 158. The master camera processor 113 (or slave camera processor 123) provides the cluster centroid and the nearest entry in the initial lens position map 158 closest to the cluster centroid.

At block 564, master camera processor 113 (or slave camera processor 123) determines a weighted average of the nearest entry in the initial lens position map 158 and the cluster centroid. The amount of weight assigned to the cluster centroid determines how quickly the lens position map 158 changes based on captured images. In some embodiments, to avoid artifacts, the slave camera lens position of the initial lens position map 158 is given greater weight than a weight assigned to the additional slave camera lens position of the cluster centroid, so that updates are more gradual. In other embodiments, a weight assigned to the additional slave camera lens position of the cluster centroid is greater than the weight of the slave camera lens position of the interpolated value from the lens position map 158, so that updates are more rapid.

At block 566, the initial lens position map 158 entry nearest to the cluster centroid is replaced with the weighted average of the nearest initial lens position map 158 entry and the cluster centroid. The result essentially moves the nearest entry in lens position map 158 along a straight line segment towards the cluster centroid.

Figure 6:
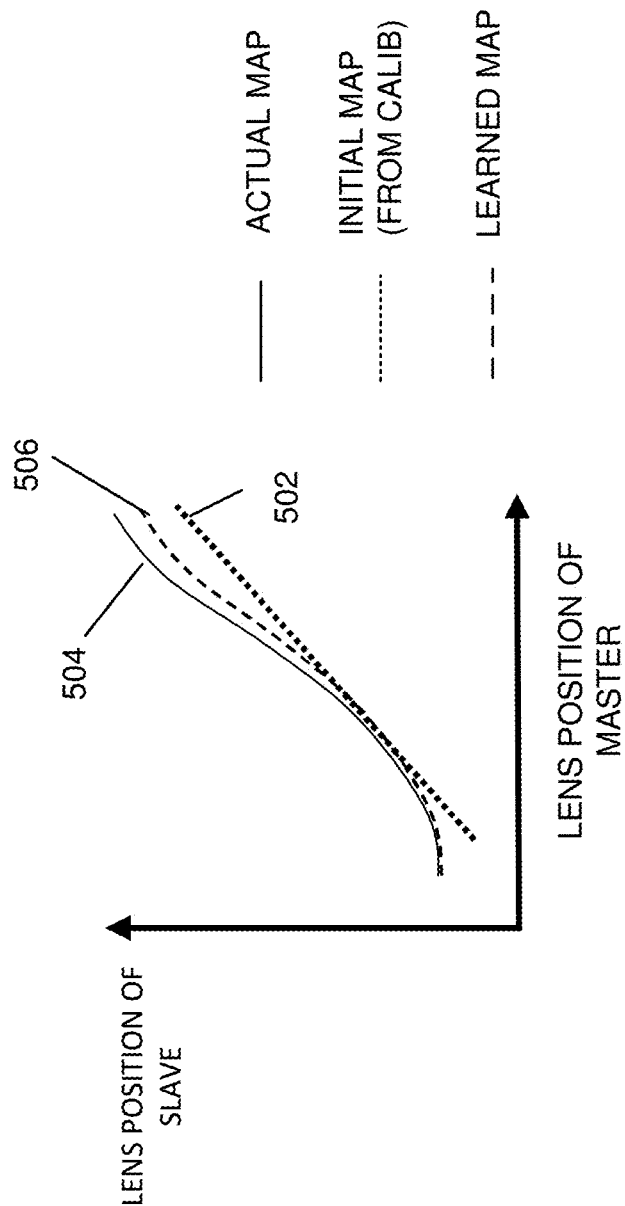
FIG. 6 is a diagram showing lens position map updates partially based on slave camera lens positions during independent slave camera autofocus operations.

FIG. 6 is a schematic diagram showing an example of updates to lens position map 158 over an extended period. In the description of FIG. 6, unless otherwise noted, the referenced devices are shown in FIG. 1A. Line 502 shows the initial lens position map 158, based on the factory calibration data, modeling the lens position relationship as being linear. Curve 504 shows an example of an actual non-linear relationship between positions of master and slave camera lenses in the case where both cameras are independently and optimally focused. Using the methods described above, as the number of captured images at varied lens positions grows very large, the lens position map 158, is expected to asymptotically approach the curve 504. Curve 506 shows an intermediate curve between the initial calibration and the slave camera lens positions observed during independent AF operations in the slave camera during capture of user-defined images. The use of a weighted average causes a gradual change in the lens position map 158 to avoid artifacts due to real-time changes in the lens position map 158.

Figure 7A:
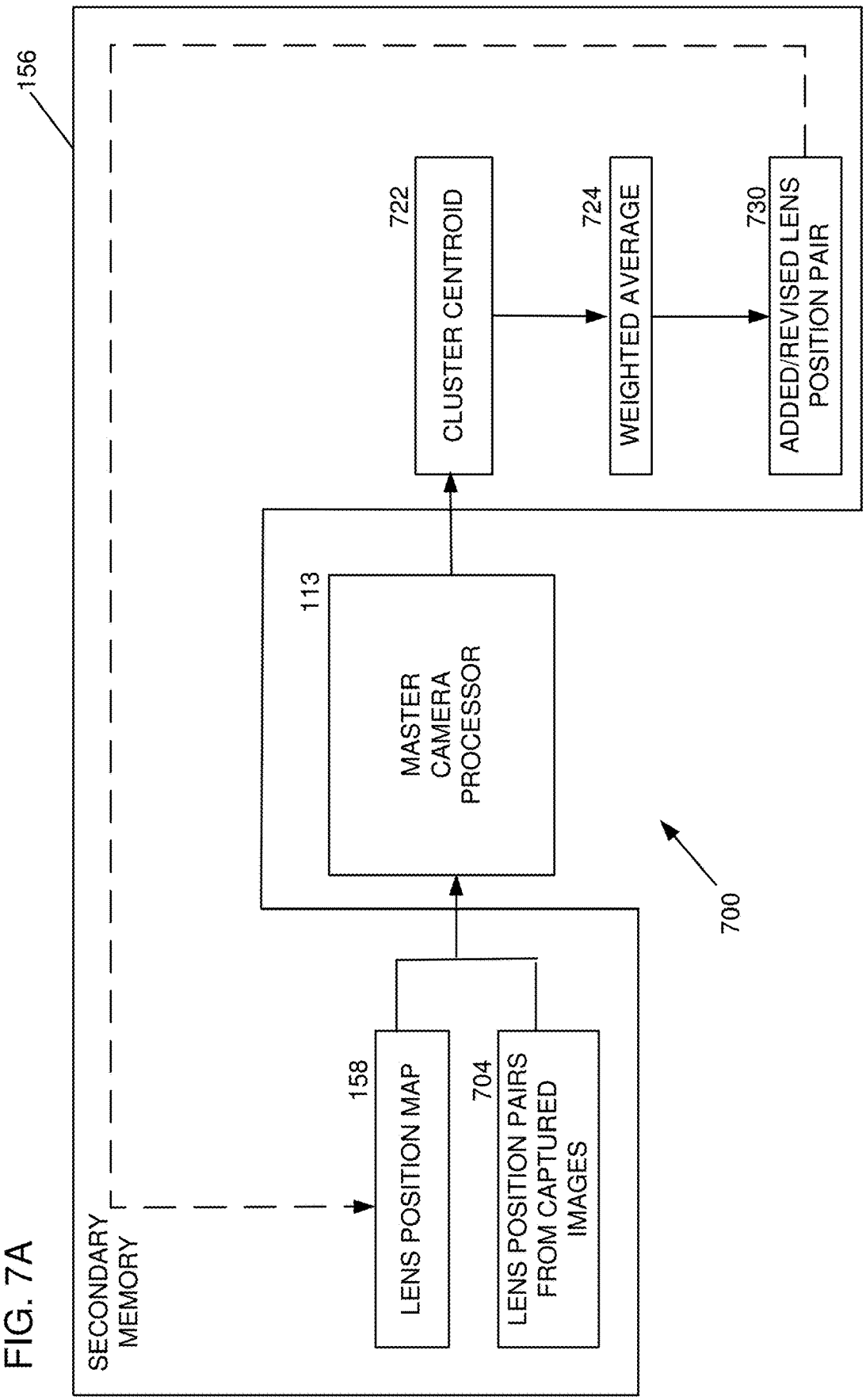
FIG. 7A is a block diagram of a lens position map update device.
Figure 7B:
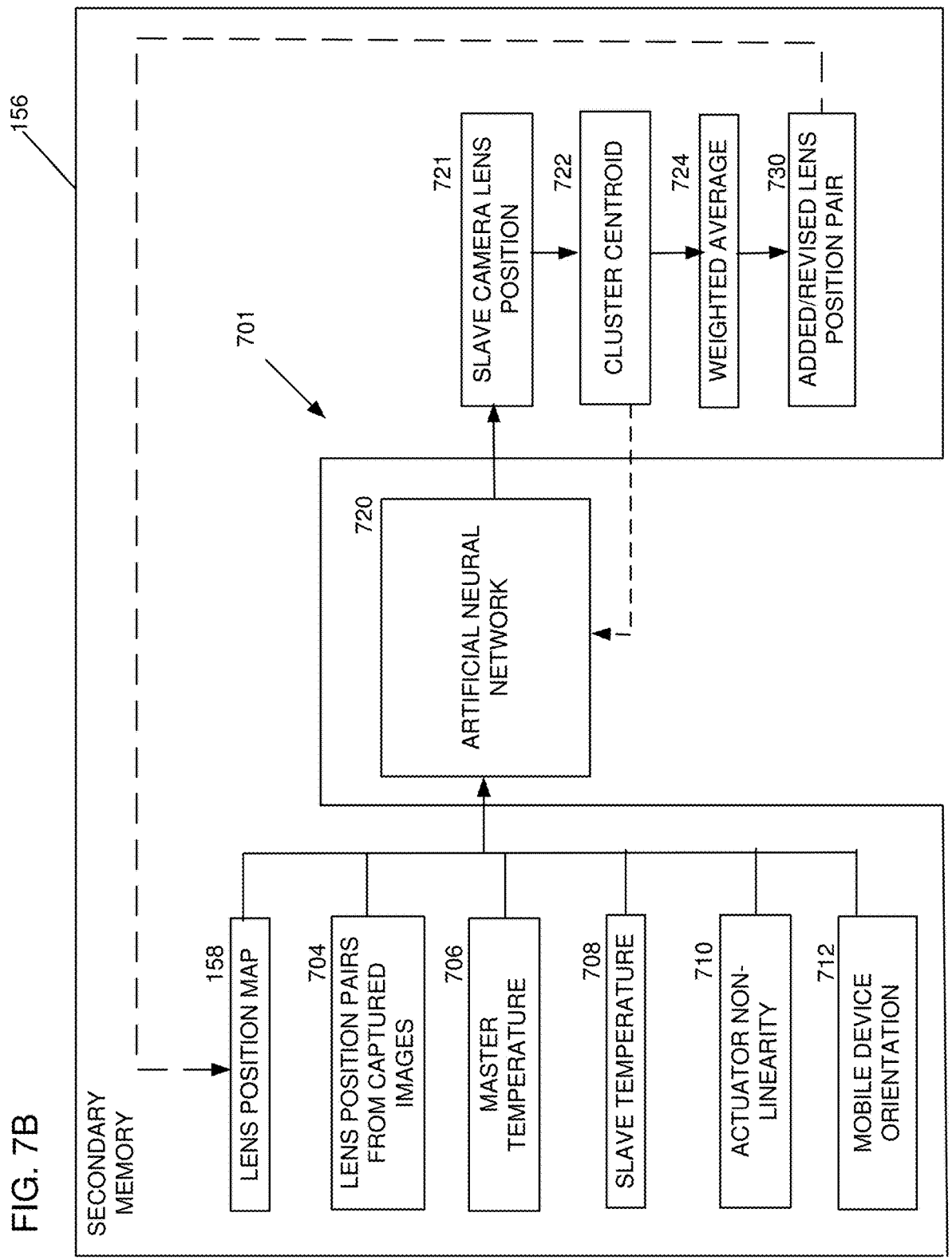
FIG. 7B is a block diagram of a lens position map update device using machine learning.

In the description of FIGS. 7A-7B, unless otherwise noted, the referenced devices are shown in FIG. 1A.

FIG. 7A is a data flow diagram of an exemplary system 700 for adaptively updating the lens position map 158. Thus FIG. 7A describes an embodiment of a means for adaptively updating the means for determining a slave camera lens position (lens position map 158), based at least partially on the additional slave camera lens position for capturing an additional user-defined image.

Block 158 is a storage area in a non-transitory, machine-readable storage medium (e.g., secondary memory 156), containing the initial lens position map 158, as shown in Table 1. Block 704 is another storage area in the non-transitory, machine-readable storage medium, containing a set of lens position pairs identified during image capture operations with independent slave camera AF operations.

The master camera processor 113 processes the lens position data. In other embodiments, the processing can be performed in the slave camera processor 123 or a general processor 153 of the mobile device 150 (all shown in FIG. 1A). The master camera processor 113 periodically collects lens position pairs until a cluster of lens position pairs satisfying the clustering criteria have been collected, using the cluster criteria discussed below.

At block 722, when a cluster of lens position pairs satisfying the clustering criteria have been collected, the master camera processor 113 determines the cluster centroid 722 by determining the mean master camera lens position and the mean slave camera lens position of the cluster. The master camera processor 113 compares the cluster centroid 722 to the nearest entry in the initial lens position map 158, and determines whether to update or add an entry (lens position pair) in the table of lens position map 158.

At block 724, the master camera processor 113 determines a weighted average of the cluster centroid 722 and an interpolated lens position pair from the initial lens position map 158.

If the cluster centroid 722 is at least a threshold distance from the nearest lens position pair in the initial lens position map 158, a new entry will be added to the lens position map 158. The new entry has the same master camera lens position as the cluster centroid 722. The slave camera lens position of the new entry is determined as the weighted average of the slave camera lens position of the cluster centroid 722 and an interpolated slave camera lens position calculated from the initial lens position map 158 based on the master camera lens position of the cluster centroid 722.

If the cluster centroid 722 is less than a threshold distance from the nearest lens position pair in the lens position map 158, an entry in the lens position map 158 nearest to the cluster centroid 722 will be replaced. The replacement entry can be determined as a weighted average 724 of the cluster centroid 722 and the nearest entry in the initial lens position map 158 (based on a Euclidean distance). As discussed above, the weight assigned to the cluster centroid 722 determines how quickly the lens position map 158 entries change in response to data from user defined images.

At block 730, the weighted average 724 is added as a new entry in the lens position map 158, or replaces the nearest entry, as discussed above. Following the update of a single lens position pair in the lens position map 158, the updated lens position map 158 becomes the new "initial" lens position map 158 for future AF operations.

FIG. 7B is a data flow diagram for the lens position map 158 updating system 701 wherein the lens position map 158 is adaptively updated using machine learning. Thus FIG. 7B describes another embodiment of a means for adaptively updating the means for determining a slave camera lens position (lens position map 158), based at least partially on the additional slave camera lens position for capturing an additional user-defined image.

An artificial neural network (ANN) 720 processes the master camera lens position and independently determines slave camera lens positions to determine the relationship between relevant input variables and the slave camera lens position. For example, in addition to the initial lens position map 158 and the pairs of independently determined master camera and slave camera lens positions 704, the ANN 720 can receive one or more of the following data: master camera lens temperature 706, slave camera lens temperature 708, actuator non-linearity curve 710 and/or orientation of the mobile device 150. The ANN 720 can adaptively update the lens position map 158 to take into account the temperatures and temperature differential between the master camera lens 111 and the slave camera lens 121, the actuator non-linearity 710 and the mobile device orientation 712.

The master camera lens temperature 706 and slave camera lens temperature 708 can be measured indirectly by temperature sensors (not shown) in the lens actuators (not shown) or other structures near the respective master and slave camera lenses 111, 121. By providing the individual lens temperatures 706, 708, the ANN 720 can take into account both the temperature differential between the master camera slave camera lenses 111, 121 and the absolute temperatures of the master and slave camera lenses 111, 121. The ANN 720 also accounts for any differences between the actual lens temperature and the measured lens temperature due to thermal resistance between the lens and the lens actuator.

Lens actuators (not shown) can actuate their lenses in a non-linear manner, for example at extreme macro focal lengths, or at focal lengths close to infinity. The actuator non-linearity 710 can be identified by a table or function defining the positions of the master camera lens 111 and slave camera lenses 121 based on input voltage to each actuator.

Because different master camera lens 111 and slave camera lenses 121 can have different weights from each other, the lens actuator position can be additionally affected by the orientation 712 of the multi-camera system 100. The orientation 712 can be measured (e.g., with accelerometers or a gyro) and input to the ANN 720.

The ANN 720 learns the relationships between the inputs (master camera lens position, temperatures 706, 708, actuator non-linearity 710 and mobile device orientation 712) and the output (lens position 721 of the independently autofocused slave camera 120). The slave camera lens positions 721 can be clustered, as discussed above. The cluster centroid can be determined at block 722. The master camera processor 113 (or slave camera processor 123) computes the weighted average 724, and an entry corresponding to a lens position pair is added to, or replaced in, the lens position map 158 at block 730.

After extended use, the ANN 720 can determine adjustments to the slave camera lens position obtained from the initial lens position map 158 to account for changes in temperatures 706, 708, actuator non-linearity 710 and mobile device orientation 712. In between independent autofocus operations by the slave camera 120, the ANN 720 can use the initial lens position map 158, temperatures 706, 708, and mobile device orientation 712 to determine the slave camera lens position 721 to be used.

Figure 8:
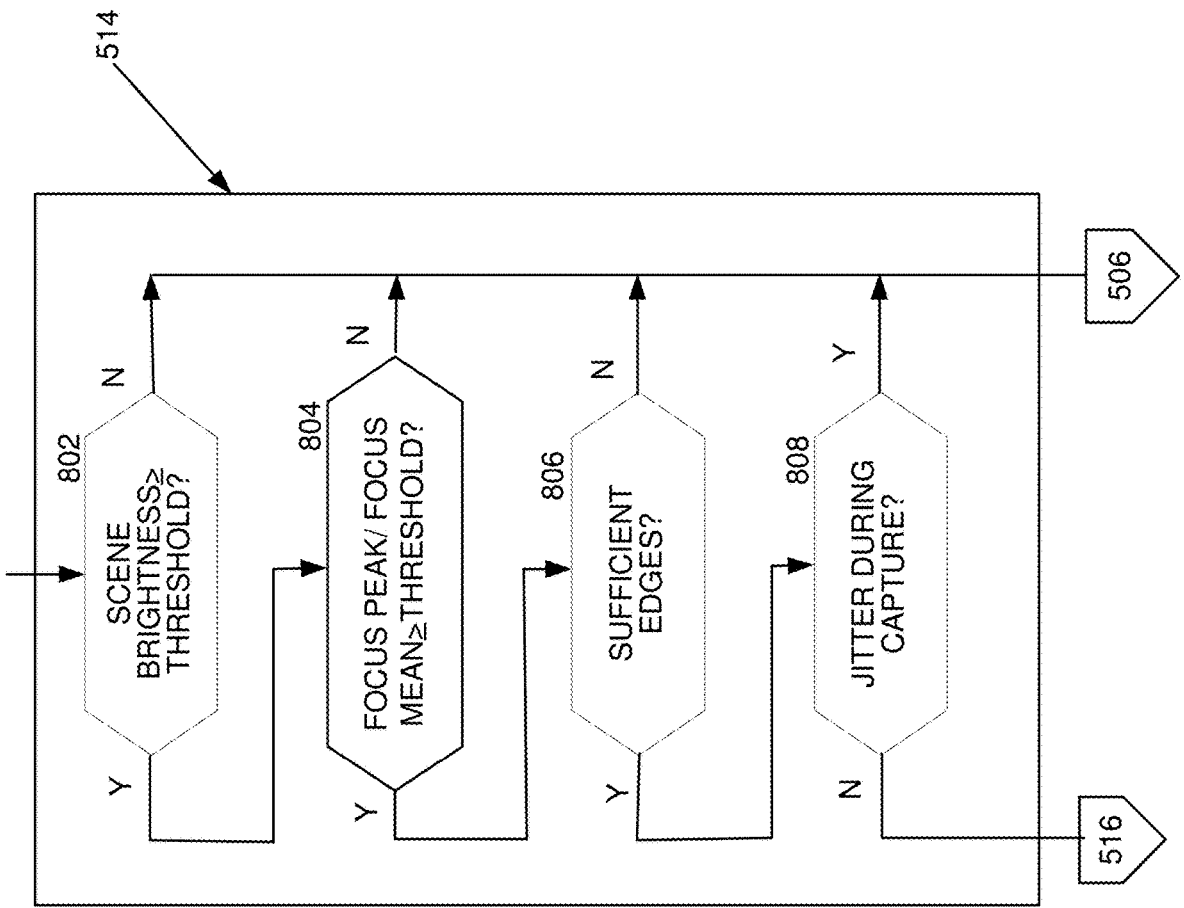
FIG. 8 is a flow chart applying sample selection criteria to a lens position pair.

FIG. 8 is a detailed flow chart of a non-limiting example of block 514 (shown in FIG. 5B). Block 514 determines whether a master/slave lens position pair from an image with independent master camera AF and independent slave camera AF operations meets one or more criteria for being used as a sample for updating the lens position map 158 (FIG. 1B). In other examples, block 514 can include fewer conditions, different conditions, or more conditions than shown in FIG. 8.

At block 802, the master camera processor 113 (or slave camera processor 123) shown in FIG. 1A determines whether the scene brightness is greater than or equal to a threshold brightness value. If not, control passes to block 506 of FIG. 5B. In response to determining that the scene brightness is greater than or equal to a threshold brightness value, control passes to block 804.

At block 804, the master camera processor 113 (or slave camera processor 123) shown in FIG. 1A determines a focus value across the image, and determines whether the ratio of the peak focus value to the mean focus value is greater than or equal to a threshold value. If not, there is no well-defined peak, and control passes to block 506 (FIG. 5B). In response to determining that the ratio of the peak focus value to the mean focus value is greater than or equal to a threshold value, control passes to block 806.

At block 806, the master camera processor 113 (or slave camera processor 123) shown in FIG. 1A determines whether the region of interest containing the current focus point has a sufficiently strong edge (i.e., a high contrast edge). If not, control passes to block 506 (FIG. 5B). In response to determining that the region of interest containing the current focus point has a sufficiently strong edge, control passes to block 808.

At block 808, the master camera processor 113 (or slave camera processor 123) shown in FIG. 1A determines whether the multi-camera system 100 (FIG. 1A) experienced jitter during capture of the image. For example, jitter can be detected by a motion sensor (accelerometer or gyro) or by an electronic image stabilizer. If jitter is detected, control passes to block 506 (FIG. 5B). In response to determining that there is no jitter, control passes to block 516 (FIG. 5B).

Figure 9:
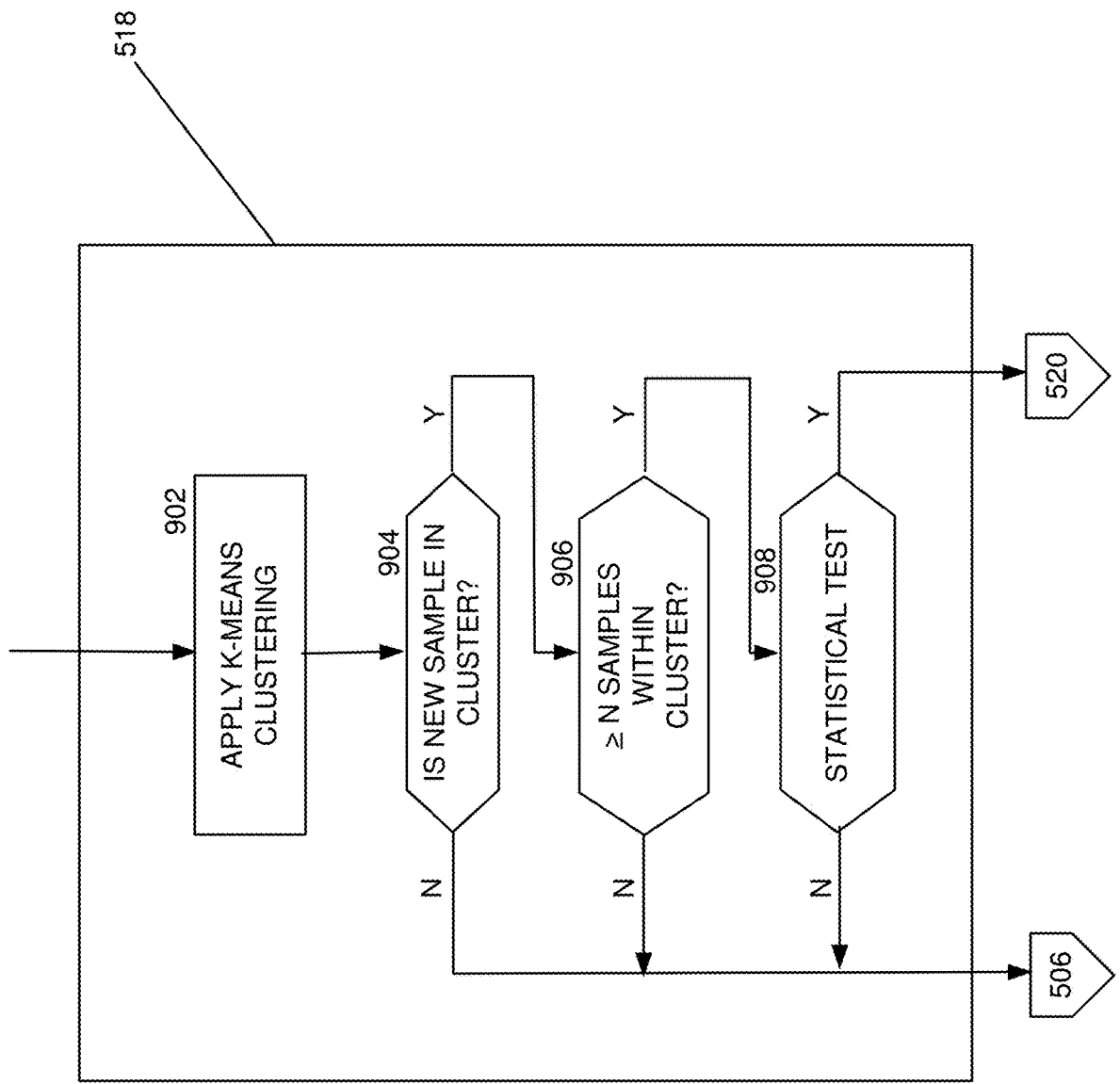
FIG. 9 is a flow chart applying cluster criteria to a plurality of lens position pairs.

FIG. 9 shows an example of an embodiment of block 518 of FIG. 5B. Block 518 assesses whether to update the lens position map 158 (FIG. 1B) after collecting a master/slave lens position pair meeting the set of predetermined sample criteria. All the blocks within FIG. 9 can be executed by the master camera processor 113 or the slave camera processor 123 or 133 (FIG. 1A).

At block 902, all of the master/slave lens position pairs from all images collected are subjected to a clustering process, such as a k-means method to divide the lens position pairs into clusters.

At block 904, a determination is made whether the new master/slave lens position pair (sample) is included within any cluster. If the sample does not belong in any cluster, then control passes to block 506 (FIG. 5B). If the sample is included in a cluster, then control passes to block 906.

At block 906, a determination is made whether the cluster including the new sample has at least a threshold number (N) of samples. If the cluster has fewer than the threshold number of samples, then control passes to block 506 (FIG. 5B). This decision block applies a coarse filter and does not update the lens position map 158 (FIG. 1B) (yet), because the cluster lacks sufficient samples to reliably update the lens position map 158 (FIG. 1B). If the cluster has at least the threshold number of samples, then control passes to block 908.

At block 908, a determination is made whether the cluster centroid 722 (FIG. 7B) has sufficient confidence to update the lens position map 158 (FIG. 1B). The determination can include applying a statistical test. For example, for a cluster with n samples and a cluster centroid (m, s), block 908 can apply a t-test to determine with a desired confidence C that the true population mean of slave lens positions is closer to the cluster centroid 722 (FIG. 7B) than the nearest entry in the lens position map 158 (FIG. 1B). (e.g., C can be 0.9 or 0.95.) If the statistical test does not reject the hypothesis that the population mean is closer to the cluster centroid 722 (FIG. 7B) than the nearest entry, then there is no addition or replacement of any lens position pair to the lens position map 158 (FIG. 1B). (In other words, the hypothesis to be tested is that the existing entry in the lens position map 158 (FIG. 1B) nearest to the cluster centroid 722 (FIG. 7B) can be the true mean of the cluster. If this hypothesis cannot be rejected, the lens position map 158 (FIG. 1B) is not updated.) If the cluster centroid 722 (FIG. 7B) does not satisfy the statistical test, then control passes to block 506 (FIG. 5B). If the cluster centroid 722 (FIG. 7B) passes the statistical test, then control passes to block 520 (FIG. 5B), and the additional master camera lens position and the additional slave camera lens position are computed based at least partially on the cluster centroid 722 (FIG. 7B), in response to a determination that the plurality of samples satisfies the statistical test.

The likelihood that any given sample is used to update the lens position map 158 (FIG. 1B) can be increased or decreased by changing the desired confidence level. For example, if the confidence level C is reduced to 0.8, then a smaller distance between the cluster centroid 722 (FIG. 7B) and the nearest entry in the initial lens position map 158 (FIG. 1B) can still result in an update to lens position map 158 (FIG. 1B).

In other embodiments, block 908 can be omitted from block 518 to increase the likelihood that the new sample is used to update the lens position map 158 (FIG. 1B). If block 908 is omitted, then the number of samples in the cluster determines whether the lens position map 158 (FIG. 1B) is updated. If the cluster including the new sample has at least the threshold number of samples, then at block 906 control passes to block 520 (FIG. 5B). The additional master camera lens position and the additional slave camera lens position are computed in response to a determination that the plurality of samples includes at least a predetermined number (N) of samples.

In other embodiments, block 908 can apply other statistical tests to determine whether to update the lens position map 158 (FIG. 1B).

Thus, the relationship between optimum master camera lens position and optimum slave camera lens position in operation can deviate from the lens position map 158 (FIG. 1B), which is based on factory calibration data. The autofocus methods for multi-camera systems, as described herein, apply progressive, dynamic updates to the lens position map 158 (FIG. 1B) used in master-slave synchronization of lens position. The exemplary methods adapt the lens position map 158 (FIG. 1B) to changing conditions such as the temperature difference across the camera modules during operation. An accurate map may reduce or eliminate the reliance on independent autofocus search in each camera. The method uses calibration results as the basis for the initial lens position map 158 (FIG. 1B) of the adaptive system and continuously improves the lens position map 158 (FIG. 1B) over the usage of camera.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method for synchronizing autofocus in a system having a master camera and a slave camera, comprising:
   focusing the slave camera based on a map and a result of an autofocus operation by the master camera, while capturing each of a plurality of images, the map comprising entries relating master camera lens positions of the master camera to corresponding slave camera lens positions of the slave camera;
   determining an initial slave camera lens position based on one or more of the entries in the map;
   determining a plurality of samples, each of the samples comprising a master camera lens position of the master camera and a slave camera lens position of the slave camera when capturing a corresponding one of the images;
   periodically performing an autofocus operation in the slave camera to determine an additional slave camera lens position for an additional image; and
   adaptively updating the map, the updating comprising:
      adding a first entry to the map or updating the first entry in the map based on a first weight assigned to the initial slave camera lens position and a second weight assigned to the plurality of samples, and
      adding a second entry to the map or updating the second entry in the map based at least partially on the additional slave camera lens position.

2. The method for synchronizing autofocus according to claim 1, wherein the updating includes adding a master camera lens position and a corresponding slave camera lens position to the map or replacing a single one of the slave camera lens positions in the map.

3. The method for synchronizing autofocus according to claim 1, wherein the map is independent of a location of the master camera.

4. The method for synchronizing autofocus in a system according to claim 1, wherein the map is adaptively updated based on a temperature differential between a master camera lens of the master camera and a slave camera lens of the slave camera.

5. The method for synchronizing autofocus in a system according to claim 1, wherein the map is adaptively updated using machine learning.

6. The method for synchronizing autofocus in a system according to claim 1, wherein the updating is performed while the system captures a plurality of images.

7. The method for synchronizing autofocus in a system according to claim 1, wherein the updating is performed based on an autofocus operation during capture of the additional image.

8. The method for synchronizing autofocus in a system according to claim 1, wherein the master camera and the slave camera are configured so that the master camera and the slave camera have a same or substantially same azimuth angle as each other and a same or substantially same elevation angle as each other, where the azimuth and elevation angles are measured relative to a reference direction.

9. The method for synchronizing autofocus in a system according to claim 1, wherein the slave camera performs the autofocus operation independently of the master camera after a predetermined number of images are captured.

10. The method for synchronizing autofocus in a system according to claim 1, wherein the additional slave camera lens position and a corresponding additional master camera lens position are determined after performing a plurality of independent autofocus operations in the slave camera.

11. The method for synchronizing autofocus in a system according to claim 1, wherein an additional entry or updated entry, comprising a master camera lens position and a corresponding slave camera lens position, is provided in the map in response to a determination that a statistic based on the plurality of samples has at least a threshold value.

12. The method for synchronizing autofocus in a system according to claim 1, wherein an additional entry or updated entry, comprising a master camera lens position and a corresponding slave camera lens position, is provided in the map in response to a determination that the plurality of samples includes at least a predetermined number of samples.

13. The method for synchronizing autofocus in a system according to claim 12, wherein the slave camera lens position of the additional entry is partially based on a set of initial master camera lens positions and corresponding initial slave camera lens positions in the map.

14. The method for synchronizing autofocus in a system according to claim 12, wherein
   adding the first entry to the map or updating the first entry in the map is based on the initial slave camera lens position and the slave camera lens positions of the plurality of samples.

15. The method for synchronizing autofocus in a system according to claim 1, wherein the first weight assigned to the initial slave camera lens position is greater than the second weight assigned to the plurality of samples.

16. A system for synchronizing autofocus in a master camera and a slave camera, comprising:
   a non-transitory, machine readable storage medium storing a map that includes entries relating master camera lens positions of the master camera to corresponding slave camera lens positions of the slave camera; and
   a processor coupled to the storage medium, the processor configured with executable instructions to:
      focus the slave camera based on the map and a result of an autofocus operation by the master camera, while capturing each of a plurality of images;
      determine an initial slave camera lens position based on one or more of the plurality of entries in the map;
      determine a plurality of samples, each of the samples comprising a master camera lens position of the master camera and a slave camera lens position of the slave camera when capturing a corresponding one of the images;
      periodically perform an autofocus operation in the slave camera to determine an additional slave camera lens position for an additional image; and
      adaptively update the map, the updating comprising:
         adding a first entry to the map or updating the first entry in the map based on a first weight assigned to the initial slave camera lens position and a second weight assigned to the plurality of samples, and adding a second entry to the map or updating the second entry in the map based at least partially on the additional slave camera lens position.

17. The system for synchronizing autofocus in a master camera and a slave camera according to claim 16, wherein the updating includes adding a master camera lens position and a corresponding slave camera lens position to the map or replacing a single one of the slave camera lens position in the map.

18. The system for synchronizing autofocus in a master camera and a slave camera according to claim 16, wherein the processor is configured with instructions to adaptively update the map based on at least one of:
   a temperature of a lens of the master camera,
   a temperature of a lens of the slave camera,
   a characteristic of a lens actuator in the master camera and a lens actuator in the slave camera, or
   an orientation of a mobile device containing the master camera and the slave camera.

19. The system for synchronizing autofocus in a master camera and a slave camera according to claim 16, wherein the processor is configured to adaptively update the map using machine learning.

20. The system for synchronizing autofocus in a master camera and a slave camera according to claim 16, wherein the master camera and slave camera are positioned within a housing, and the master camera and the slave camera are configured so that the master camera and the slave camera have a same azimuth angle as each other and a same elevation angle as each other.

21. The system for synchronizing autofocus in a master camera and a slave camera according to claim 16, wherein the processor is configured with instructions to initiate an independent autofocus operation in the slave camera, each time a predetermined number of images are captured.

22. The system for synchronizing autofocus in a master camera and a slave camera according to claim 16, wherein the processor is configured with instructions to determine the additional slave camera lens position and a corresponding additional master camera lens position after performing a plurality of independent autofocus operations in the slave camera.

23. The system for synchronizing autofocus in a master camera and a slave camera according to claim 16, wherein the processor is configured with instructions to:
   determine an initial slave camera lens position based on one or more entries in the map, and
   add an entry to the map or update an entry in the map based on the initial slave camera lens position and a plurality of slave camera lens positions from a plurality of independent autofocus operations by the slave camera.

24. A system for synchronizing autofocus in a master camera and a slave camera, comprising:
   means for determining an initial slave camera lens position for focusing a slave camera in response to an autofocus operation performed by the master camera;
   means for determining a plurality of samples, each of the plurality of samples comprising a master camera lens position of the master camera and a slave camera lens position of the slave camera when capturing a corresponding image;
   means for periodically initiating an autofocus operation in the slave camera to determine an additional slave camera lens position for capturing an additional image;
   means for adaptively updating a map, the means for adaptively updating comprising:
      means for adding a first entry to the map or updating the first entry in the map based on a first weight assigned to the initial slave camera lens position and a second weight assigned to the plurality of samples; and
      means for adding a second entry to the map or updating the second entry in the map based at least partially on the additional slave camera lens position; and
   means for determining a slave camera lens position based at least partially on the map.

25. A non-transitory, machine readable storage medium storing data and instructions, wherein the instructions are executable by a processor for synchronizing autofocus in a master camera and a slave camera, the medium comprising:
   a map comprising a plurality of entries, each of the plurality of entries relating a master camera lens positions of the master camera to a corresponding slave camera lens positions of the slave camera; and
   instructions to focus the slave camera based on the map and a result of an autofocus operation by the master camera, while capturing each of a plurality of images;
   instructions to determine an initial slave camera lens position based on one or more of the plurality of entries in the map;
   instructions to determine a plurality of samples, each of the plurality of samples comprising a master camera lens position of the master camera and a slave camera lens position of the slave camera when capturing a corresponding one of the images,
   instructions to periodically perform an autofocus operation in the slave camera to determine an additional slave camera lens position for an additional image; and
   instructions to adaptively update the map comprising:
      instructions to add a first entry to the map or updating the first entry in the map based on a first weight assigned to the initial slave camera lens position and a second weight assigned to the plurality of samples; and
      instructions to add a second entry to the map or updating the second entry in the map based at least partially on the additional slave camera lens position.

* * * * *